(12) United States Patent
Kim et al.

(10) Patent No.: US 9,055,242 B2
(45) Date of Patent: Jun. 9, 2015

(54) IMAGE SENSOR CHIP, METHOD OF OPERATING THE SAME, AND SYSTEM INCLUDING THE IMAGE SENSOR CHIP

(71) Applicants: Tae Chan Kim, Yongin-si (KR); Hae Kyoung Kong, Yongin-si (KR)

(72) Inventors: Tae Chan Kim, Yongin-si (KR); Hae Kyoung Kong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 13/835,497

(22) Filed: Mar. 15, 2013

(65) Prior Publication Data

US 2014/0009650 A1      Jan. 9, 2014

(30) Foreign Application Priority Data

Jul. 5, 2012   (KR) .................. 10-2012-0073439

(51) Int. Cl.
| | |
|---|---|
| *H04N 3/16* | (2006.01) |
| *H04N 9/04* | (2006.01) |
| *H04N 5/335* | (2011.01) |
| *H04N 5/222* | (2006.01) |
| *H04N 5/225* | (2006.01) |
| *H04N 5/232* | (2006.01) |
| *H04N 5/369* | (2011.01) |
| *H04N 5/376* | (2011.01) |
| *H04N 5/378* | (2011.01) |

(52) U.S. Cl.
CPC ............. *H04N 5/335* (2013.01); *H04N 5/2226* (2013.01); *H04N 5/2258* (2013.01); *H04N 5/23245* (2013.01); *H04N 5/3696* (2013.01); *H04N 5/376* (2013.01); *H04N 5/378* (2013.01)

(58) Field of Classification Search
CPC ............................ H04N 5/335; H04N 5/2226
USPC ............................... 348/222.1, 294, 349, 350
See application file for complete search history.

(56) References Cited

U.S. PATENT DOCUMENTS

| | | | |
|---|---|---|---|
| 2011/0234481 A1* | 9/2011 | Katz et al. ..................... 348/746 |
| 2011/0292370 A1* | 12/2011 | Hills et al. ................... 356/5.01 |
| 2012/0175685 A1* | 7/2012 | Kim et al. ...................... 257/225 |
| 2012/0236121 A1* | 9/2012 | Park et al. ........................ 348/46 |
| 2013/0027577 A1* | 1/2013 | Holscher et al. ............ 348/222.1 |

\* cited by examiner

*Primary Examiner* — Gevell Selby
(74) *Attorney, Agent, or Firm* — Sughrue Mion, PLLC

(57) ABSTRACT

A method of operating an image sensor chip including a motion sensor pixel sensing a motion of an object and a depth sensor pixel, the method including the operations of activating either the depth sensor pixel or the motion sensor pixel according to a mode selection signal, and processing a pixel signal output by either the activated depth sensor pixel or the activated motion sensor pixel.

28 Claims, 29 Drawing Sheets

IMAGE SENSOR CHIP, METHOD OF OPERATING THE SAME, AND SYSTEM INCLUDING THE IMAGE SENSOR CHIP

CROSS-REFERENCE TO RELATED APPLICATIONS

This application claims the benefit of Korean Patent Application No. 10-2012-0073439, filed on Jul. 5, 2012, in the Korean Intellectual Property Office, the disclosure of which is incorporated herein in its entirety by reference.

BACKGROUND

Example embodiments relate to image sensor chips. More particularly, example embodiments relate to a method of obtaining image data, based on a pixel signal output from one of a depth sensor pixel, and a motion sensor pixel included in the image sensor chip, and devices using the method.

Complementary metal-oxide semiconductor (CMOS) image sensors are solid-state image sensing devices that use a CMOS. The CMOS image sensors are manufactured at low costs, compared to charge coupled device (CCD) image sensors which include high-voltage analog circuits, and consume less power because of their relatively small size. As performance of the CMOS image sensors has improved, the CMOS image sensors are widely used. For example, the CMOS image sensors are used in various home appliances and portable devices, such as smart phones and digital cameras.

In mobile devices, attempts are being made to reduce a power consumption of CMOS image sensors. Since power consumption and performance have a trade-off, it is necessary to reduce the power consumption of CMOS image sensors as much as possible, without reducing the performance.

SUMMARY

According to an aspect of the exemplary embodiments, there is provided a method of operating an image sensor chip which comprises a motion sensor pixel sensing a motion of an object and a depth sensor pixel, the method comprising activating either the depth sensor pixel or the motion sensor pixel according to a mode selection signal, and processing a pixel signal output by either the activated depth sensor pixel or the activated motion sensor pixel.

According to an embodiment, the method may further include, before the activating either the depth sensor pixel or the motion sensor pixel, activating the motion sensor pixel as default, and changing a level of the mode selection signal, based on a pixel signal output from the default activated motion sensor pixel. According to an embodiment, the changing the level of the mode selection signal may include changing the level of the mode selection signal when data generated by a result of a processing of the pixel signal output from the default activated motion sensor pixel is consistent with reference data.

According to another embodiment, the method may further include analyzing a user input, and generating the mode selection signal according to the analyzed result of the user input. According to an embodiment, the motion sensor pixel may be a dynamic vision sensor (DVS) pixel, and the depth sensor pixel may be a time-of-flight (TOF) sensor pixel obtaining depth information between the object and the image sensor chip according to a TOF method.

According to another aspect of the exemplary embodiment, there is provided a method of operating an image sensor chip that comprises a motion sensor pixel capable of sensing a motion of an object and a depth sensor pixel, the method comprising activating the motion sensor pixel, determining whether to activate the depth sensor pixel, according to a mode selection signal, and processing a pixel signal output by either the motion sensor pixel or the depth sensor pixel, based on a result of the determination and the mode selection signal.

According to an embodiment, the processing of the pixel signal may comprise processing the pixel signal output by the depth sensor pixel when the depth sensor pixel is activated, and processing the pixel signal output by the motion sensor pixel when the depth sensor pixel is deactivated. According to an embodiment, the motion sensor pixel may be a DVS pixel, and the depth sensor pixel may be a TOF sensor pixel obtaining depth information between the object and the image sensor chip according to a time-of-flight (TOF) method.

According to another aspect of the exemplary embodiments, there is provided an image sensor chip, the image sensor chip which includes a pixel array including a depth sensor pixel group comprising a plurality of depth sensor pixels and a motion sensor pixel group which includes a plurality of motion sensor pixels, a control circuit which is configured to activate either the depth sensor pixel group or the motion sensor pixel group according to a mode selection signal, and a pixel signal processing circuit which is configured to process pixel signals output by either the activated depth sensor pixel group or the activated motion sensor pixel group. According to an embodiment, the image sensor chip may further comprise a motion sensor pixel enable controller which is configured to control power, which is supplied to the motion sensor pixel group, under a control of the control circuit.

According to an embodiment, each of the plurality of motion sensor pixels may be a DVS pixel. The pixel signal processing circuit may include a row address event representation (AER) which is configured to process at least one of a plurality of event signals generated by the plurality of motion sensor pixels, and a column AER which is configured to process at least one other of the plurality of event signals generated by the plurality of motion sensor pixels. The row AER may be arranged on an opposite side of a row driver for activating the plurality of depth sensor pixels.

According to an embodiment, the row AER may be arranged on a same side as a row driver for activating the plurality of depth sensor pixels. The motion sensor pixel group and the depth sensor pixel group may be separately arranged from each other.

According to another embodiment, each of the plurality of motion sensor pixels may be disposed between the depth sensor pixels. According to another embodiment, the plurality of motion sensor pixels may be disposed on edges of the depth sensor pixel group. The plurality of motion sensor pixels may alternate with the plurality of depth sensor pixels in a row direction. The plurality of motion sensor pixels may alternate with the plurality of depth sensor pixels in a column direction.

According to an embodiment, a size of each of the plurality of motion sensor pixels may be different from a size of each of the plurality of depth sensor pixels. According to an embodiment, a motion sensor pixel and a depth sensor pixel having an identical column address, from among the plurality of motion sensor pixels and the plurality of depth sensor pixels, may share at least one signal line.

According to an embodiment, the pixel signal processing circuit may comprise a motion sensor pixel signal processing circuit which is configured to process pixel signals output from the motion sensor pixel group, and a depth sensor pixel signal processing circuit which is configured to processes pixel signals output by the depth sensor pixel group. According to an embodiment, the pixel signal processing circuit may further comprise an output selection circuit which is configured to select either an output of the motion sensor pixel signal processing circuit or an output of the depth sensor pixel signal processing circuit.

According to another aspect of the exemplary embodiments, there is provided a system on chip (SoC) comprising the image sensor chip, an image signal processor (ISP) which is configured to process image data output by the image sensor chip, and a central processing unit (CPU) which is configured to receive processed image data from the ISP and generates a mode selection signal based on the processed image data.

According to another aspect of the exemplary embodiments, there is provided an image sensor chip comprising a pixel array including a depth sensor pixel and a motion sensor pixel, and an output selection circuit which is configured to select either a signal received from the depth sensor pixel or a signal received from the motion sensor pixel according to a mode selection signal and outputs the selected signal.

According to an embodiment, the motion sensor pixel may be a DVS pixel, and the depth sensor pixel may be a TOF sensor pixel. The output selection circuit may comprise a multiplexer.

According to another aspect of the exemplary embodiments, the is provided an image processing system including an image sensor which generates image data corresponding to either depth information from at least one depth sensor pixel or motion information from at least one motion sensor pixel and transmits the image data, an image signal processor (ISP) which is configured to receive and process the image data from the image sensor, and transmit the processed image data, and a display unit which is configured to receive the processed image data, and display the processed image data.

BRIEF DESCRIPTION OF THE DRAWINGS

Exemplary embodiments will be more clearly understood from the following detailed description taken in conjunction with the accompanying drawings in which.

DETAILED DESCRIPTION OF THE EXEMPLARY EMBODIMENTS

Figure 1:
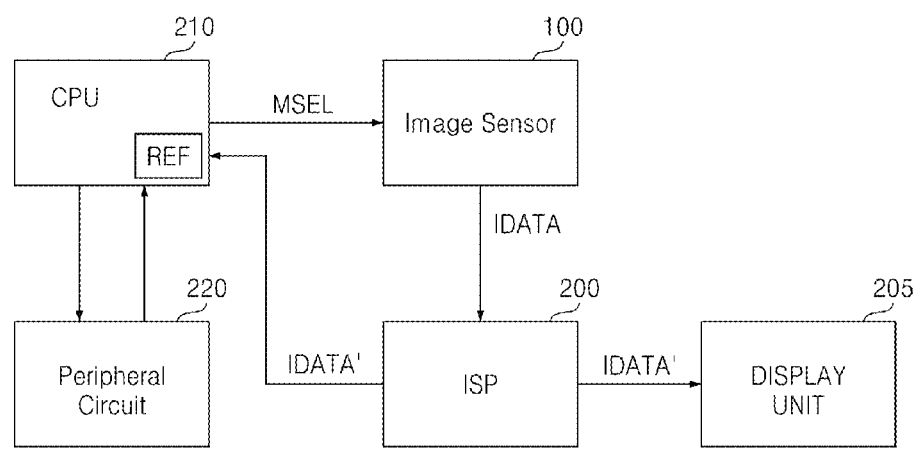
FIG. 1 is a block diagram of an image processing system according to the exemplary embodiments.

FIG. 1 is a block diagram of an image processing system 10 according to the exemplary embodiments. Referring to FIG. 1, the image processing system 10 may include an image sensor 100, an image signal processor (ISP) 200, a display unit 205, a central processing unit (CPU) 210, and a peripheral circuit 220.

The image processing system 10 may be implemented by a system on chip (SoC). The image processing system 10 may perform a function of a depth sensor capable of acquiring depth information of an object, and a function of a motion sensor capable of acquiring motion information by detecting a motion of the object.

According to an embodiment, a motion sensor may analyze an image that is sensed (or captured) in units of frames of an object, and may store shading information about each frame as a digital code in a frame memory (not shown) according to a result of the analysis. The motion sensor may compare pieces of shading information about a previous frame and a current frame stored in the frame memory with each other, and may sense a motion of the object according to a result of the comparison.

When acquiring shading information about a pixel, the motion sensor may process the acquired shading information together with shading information about pixels (for example, 4 pixels, namely, upper, lower, left, and right pixels) adjacent to the pixel, and calculate a direction of movement of a shading corresponding to the shading information according to a result of the processing.

According to another embodiment, the motion sensor may include a signal storage device (for example, a capacitor) in each pixel. The motion sensor may store a voltage value corresponding to a pixel signal of a previous frame of the object, compare the stored voltage value with a voltage value corresponding to a pixel signal of a current frame of the object, and sense a motion of the object according to a result of the comparison.

The image sensor 100 may generate depth information output from at least one depth sensor pixel (not shown) and/or motion information output from at least one motion sensor pixel (not shown), and may transmit digital data corresponding to the depth information or the motion information to the ISP 200. For example, the digital data may be image data IDATA.

The image sensor 100 may output the image data IDATA corresponding to the depth information (or a depth image) or the motion information (or a motion image), according to a mode selection signal MSEL output by the CPU 210. The CPU 210 is an example of a logic or hardware capable of generating the mode selection signal MSEL. For example, when the mode selection signal MSEL is in a first level, for example, a low level, the image sensor 100 may output image data IDATA corresponding to the motion image, and, when the mode selection signal MSEL is in a second level, for example, a high level, the image sensor 100 may output image data IDATA corresponding to the depth image. However, the embodiments are not limited.

The image sensor 100 may be implemented by a separate, independent chip. The image sensor 100 may be implemented by using a CMOS image sensor chip.

The ISP 200 may receive the image data IDATA, and process the image data IDATA to generate processed image data IDATA'. For example, the ISP 200 may process or configure the image data IDATA in units of frames. Also, the ISP 200 may correct light and shade, contrast, chroma, etc., of the image data IDATA.

According to an embodiment, the ISP 200 may include a frame memory, compare shading information of a previous frame with shading information of a current frame by using the frame memory, and generate the motion information or the motion image based on a result of the comparison. According to another embodiment, the ISP 200 may process the shading information about a pixel, together with shading information about pixels adjacent to the pixel, and calculate a direction of movement of a shading corresponding to the shading information, according to a result of the processing.

The ISP 200 may transmit the processed image data IDATA' to the display unit 205 and/or the CPU 210. According to an embodiment, the ISP 200 may control the entire operation of the image sensor 100 by controlling a control register block (not shown) included in the image sensor 100. Although the ISP 200 is implemented outside the image sensor 100 in the present embodiment, the ISP 200 may also be implemented inside the image sensor 100.

The display unit 205 denotes a device capable of displaying the processed image data IDATA'. The CPU 210 may receive the processed image data IDATA' from the ISP 200, analyze the processed image data IDATA', and generate a mode selection signal MSEL based on a result of the analysis. The CPU 210 may transmit the mode selection signal MSEL to the image sensor 100.

For example, when power is supplied to the image processing system 10 or the image processing system 10 is booted, the CPU 210 may output the mode selection signal MSEL in a default level, for example, in a low level, to the image sensor 100. The CPU 210 may analyze the processed image data IDATA', and, when it is analyzed that a mode change is necessary, the CPU 210 may change the level of the mode selection signal MSEL from a low level to a high level, and output the mode selection signal MSEL in a high level.

According to an embodiment, the CPU 210 may compare the processed image data IDATA' with reference data REF, and generate the mode selection signal MSEL based on a result of the comparison. When the processed image data IDATA' is consistent with the reference data REF, the CPU 210 may change the level of the mode selection signal MSEL. For example, the reference data REF may be a specific two-dimensional (2D) image, such as the fingerprint or the face of a person, a three-dimensional (3D) image including distance information, or reference motion data that represents a continuous motion, such as a gesture of a body, for example, a hand. The reference data REF is programmable. The reference data REF may be stored in a register.

According to an embodiment, the reference data REF may be motion data about a motion, that an object, for example, a person, draws a circle with his or her hand. In this case, the CPU 210 may compare the processed image data IDATA' with the reference data REF, and generate the mode selection signal MSEL in a first level or a second level based on a result of the comparison.

According to another embodiment, the motion sensor pixel (not shown) may be activated as default, and the depth sensor pixel (not shown) may be deactivated, for example, be in a sleep mode as default. For example, when a motion of a person is input as the image data IDATA' and the input image data IDATA' is consistent with the reference data REF, the CPU 210 may activate, e.g., wake up, the depth sensor pixel (not shown) or activate another system, e.g., a power system or a sound system connected to the image processing system 10, or a specific application. The reference data REF may vary according to a user request. The reference data REF may be set to be a default value.

The CPU 210 may interpret data received from the peripheral circuit 220, generate the mode selection signal MSEL based on a result of the interpretation, and transmit the mode selection signal MSEL to the image sensor 100.

The image sensor 100 may generate the depth information by using a depth sensor or the motion information by using a motion sensor, according to the received mode selection signal MSEL, and output the image data IDATA corresponding to the generated depth information or motion information.

The peripheral circuit 220 may provide data that is generated according to the state of the image processing system 10 or various inputs, to the CPU 210. According to an embodiment, the peripheral circuit 220 may be implemented by using an input interface. In this case, the peripheral circuit 220 may perform a function of an input interface and may provide the CPU 210 with data generated according to an input of a user. The input interface may be an input device such as a button, a touch screen, or a mouse. The CPU 210 may generate the mode selection signal MSEL based on the data.

According to another embodiment, the peripheral circuit 220 may be implemented using a power monitoring module. In this case, when it is determined that the power of the image processing system 10 is insufficient, the peripheral circuit 220 implemented using a power monitoring module may transmit data generated according to a result of the determination, to the CPU 210. The CPU 210 may generate the mode selection signal MSEL based on the data.

According to another embodiment, the peripheral circuit 220 may be implemented by using an application execution module. In this case, the peripheral circuit 220 implemented by using an application execution module may monitor execution of a specific application, and transmit data generated according to a result of the monitoring, to the CPU 210. The CPU 210 may generate the mode selection signal MSEL based on the data. The specific application may be a camera driving application or an augmented reality application, but is not limited thereto.

Figure 2:
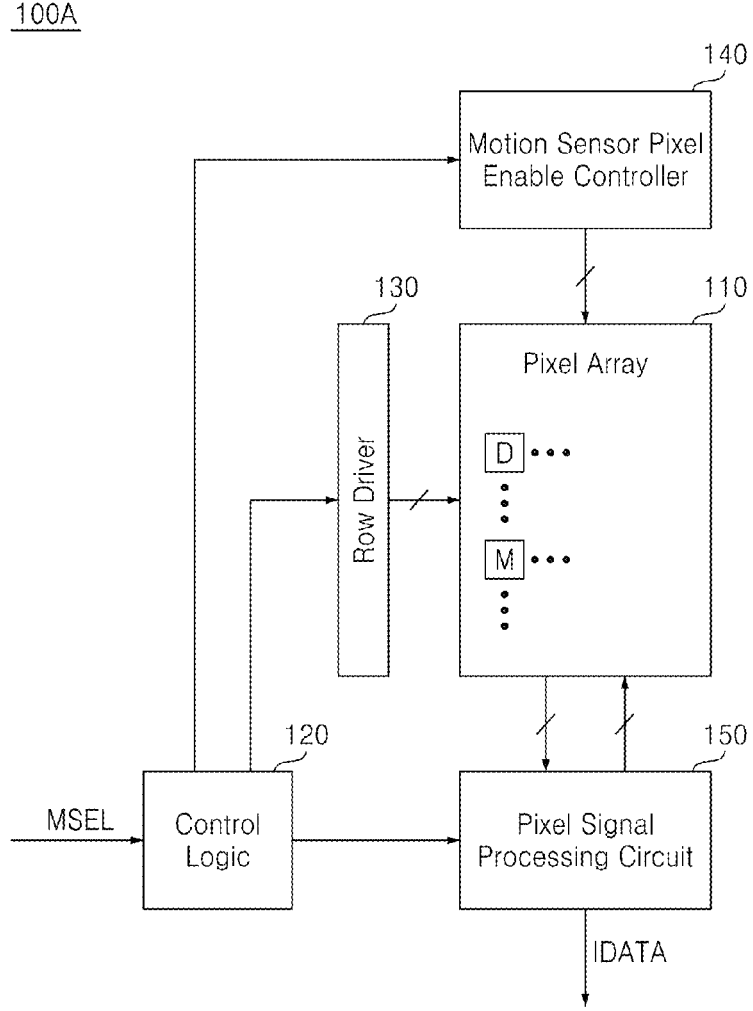
FIG. 2 is a block diagram of an embodiment of an image sensor included in the image processing system of FIG. 1.

FIG. 2 is a block diagram of an image sensor 100A which is an embodiment of the image sensor 100 illustrated in FIG. 1. Referring to FIG. 2, the image sensor 100A may include a pixel (sensor) array 110, a control logic (or a control circuit) 120, a row driver 130, a motion sensor pixel enable controller 140, and a pixel signal processing circuit 150.

The pixel (sensor) array 110 includes a plurality of depth sensor pixels D for obtaining depth information of an object, and a plurality of motion sensor pixels M for sensing a motion of the object. According to an embodiment, when the depth sensor pixels D included in the pixel array 110 are time-of-flight (TOF) sensor pixels that operate according to a TOF method, the image sensor 100A may further include a light source (not shown) (for example, an infrared (IF) light source) which is controlled by the control logic 120, and an IF pass filter (not shown) for filtering out light, other than light reflected from the object, from among the light outpu.t from the light source. According to an embodiment, each of the motion sensor pixels may be implemented by using a dynamic vision sensor (DVS) pixel. However, embodiments are not limited.

The control logic 120 may control the entire operation of the image sensor 100A, based on the mode selection signal MSEL. The control logic 120 may control the row driver 130, the motion sensor pixel enable controller 140, and the pixel signal processing circuit 150.

The row driver 130 may activate the depth sensor pixels D in units of rows, under the control of the control logic 120. The motion sensor pixel enable controller 140 may activate the motion sensor pixels M under the control of the control logic 120. According to an embodiment, the motion sensor pixel enable controller 140 may control the power, which is to be supplied to the motion sensor pixels M, under the control of the control logic 120.

According to an embodiment, the control logic 120 may control the row driver 130 and the motion sensor pixel enable controller 140, based on the mode selection signal MSEL so that either a depth sensor pixel group including the depth sensor pixels D or a motion sensor pixel group including the motion sensor pixels M is activated. In this case, the pixel signal processing circuit 150 may process a pixel signal output by the pixel array 110 (for example, pixel signals output from the motion sensor pixels M or pixel signals output from the depth sensor pixels D), and generate the image data IDATA corresponding to a result of the processing.

According to another embodiment, the control logic 120 may only control whether to enable the depth sensor pixel group including the depth sensor pixels D, according to the mode selection signal MSEL, when the motion sensor pixel group including the motion sensor pixels M is activated. In this case, the pixel signal processing circuit 150 may select only one of a pixel signal output from each motion sensor pixel M and a pixel signal output from each depth sensor pixel D, and generate the image data IDATA based on a result of the selection.

According to an embodiment, when each of the motion sensor pixels M is implemented using a DVS pixel, the pixel signal processing circuit 150 may include an address event representation (AER) (not shown). The AER may process an event signal output from each of the motion sensor pixels M as a change in light amount is sensed, and transmit a signal for resetting the motion sensor pixel that output the event signal to the motion sensor pixel. An operation and an arrangement of the AER will be described in detail with reference to FIGS. 3, 16, 17, and 19.

Figure 3:
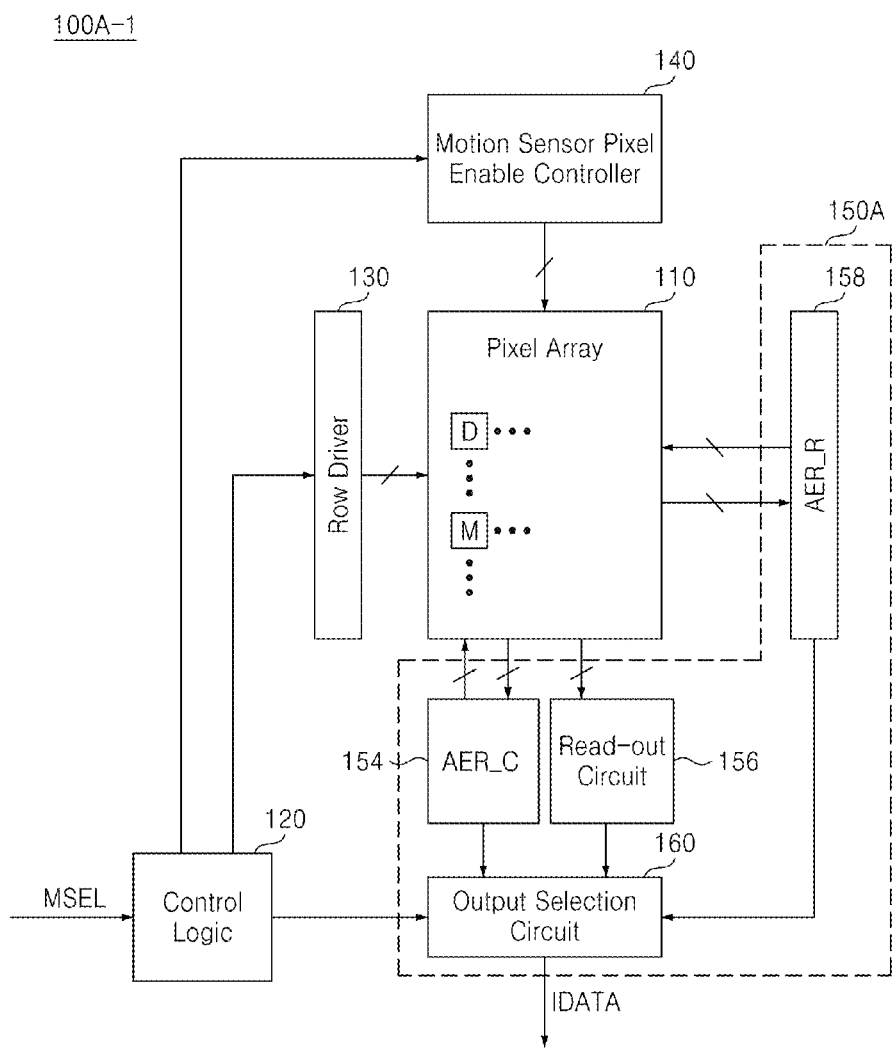
FIG. 3 is a block diagram of an image sensor including an embodiment of a pixel signal processing circuit illustrated in FIG. 2.

FIG. 3 is a block diagram of an image sensor 100A-1 including a pixel signal processing circuit 150A which is an embodiment of the pixel signal processing circuit 150 of FIG. 2. In FIG. 3, when each of the motion sensor pixels M is implemented by using a DVS pixel.

Referring to FIGS. 2 and 3, the pixel signal processing circuit 150A may include a column AER 154, a read-out circuit 156, a row AER 158, and an output selection circuit 160.

Each of the motion sensor pixels M, included in the pixel array 110, may output an event signal with a change in light amount. In this case, the column AER 154 may receive the event signal and output a column address value of the motion sensor pixel that output the event signal, based on the received event signal. The event signal will be described in detail with reference to FIG. 11.

The read-out circuit 156 may receive a pixel signal output from each of the depth sensor pixels D included in the pixel array 110, and process the received pixel signal. According to an embodiment, the read-out circuit 156 may include a column decoder, a column driver, an output buffer, etc., which are not shown. The column AER 154 and the read-out circuit 156 may be implemented using separate circuits.

The row AER 158 may receive the event signal output from each of the motion sensor pixels M, and output a row address value of the motion sensor pixel that outputs the event signal, based on the received event signal. The row address value may be transmitted to the output selection circuit 160. The row AER 158 may be implemented on the opposite side of the row driver 130.

The output selection circuit 160 may select at least one of an output signal of the column AER 154, an output signal of the row AER 158, and an output signal of the read-out circuit 156 under the control of the control logic 120, and output the image data IDATA based on a result of the selection.

According to an embodiment, the output selection circuit 160 may select either the output signal of the column AER 154 or the output signal of the row AER 158 under the control of the control logic 120, and output the image data IDATA based on a result of the selection. According to another embodiment, the output selection circuit 160 may select the output signal of the read-out circuit 156 under the control of the control logic 120, and output the image data IDATA based on a result of the selection.

The output selection circuit 160 may be implemented using a circuit for selecting one from a plurality of input signals, for example, a multiplexer. However, the implementation of the output selection circuit 160 is not limited. According to an embodiment, when at least one signal is output from either the depth sensor pixel group including the depth sensor pixels D or the motion sensor pixel group including the motion sensor pixels M, the output selection circuit 160 may bypass the at least one signal.

FIGS. 4 through 8 illustrate pixel arrays 110-1 through 110-5 (collectively referred to as a pixel array 110) which are embodiments of the pixel array 110 of FIG. 2. Although the pixel array 110 is implemented using a 5×5 matrix in FIGS. 4 through 7 for convenience, the implementation of the pixel array 110 is not limited thereto.

Referring to FIGS. 2 and 4-8, the pixel array 110 includes a depth sensor pixel group including a plurality of depth sensor pixels D, and a motion sensor pixel group including a plurality of motion sensor pixels M. According to an embodiment, one of or both the depth sensor pixel group and the motion sensor pixel group may be enabled, according to the mode selection signal MSEL.

Figure 4:
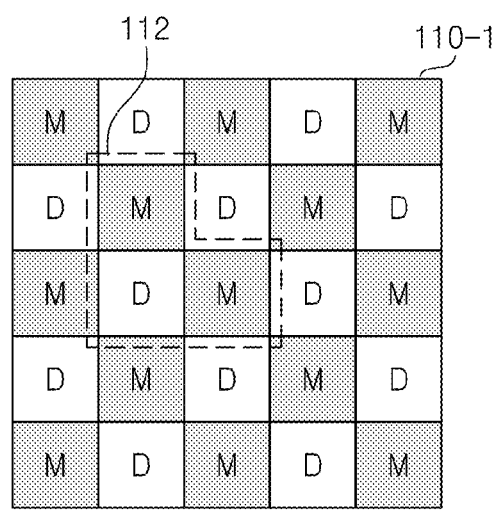
FIG. 4 illustrates an embodiment of a pixel array illustrated in FIG. 2.
Figure 4:
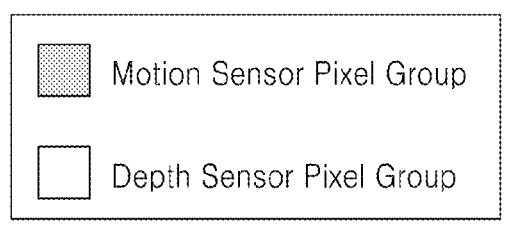

Each of the depth sensor pixels D, included in the pixel array 110-1 of FIG. 4, may be interposed between two adjacent motion sensor pixels M. According to an embodiment, a plurality of motion sensor pixels M may be interposed between two adjacent depth sensor pixels D, but embodiments are not limited thereto. According to another embodiment, the depth sensor pixels D and the motion sensor pixels M may be arranged at irregular intervals.

Figure 5:
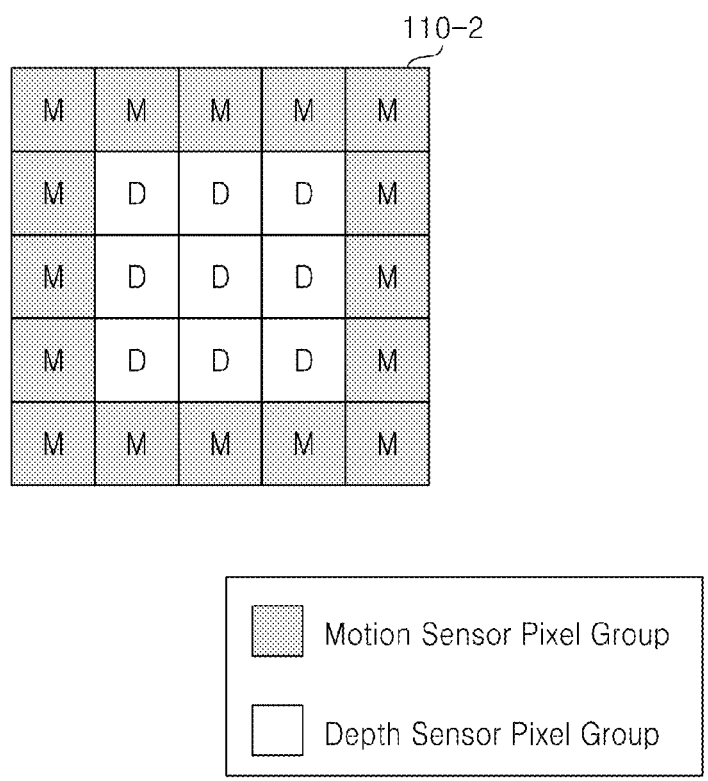
FIG. 5 illustrates other embodiment of the pixel array illustrated in FIG. 2.

The pixel array 110-2 of FIG. 5 may include a depth sensor pixel group formed at the center, and motion sensor pixels M arranged on edges of the depth sensor pixel group. In other words, a motion sensor pixel group, including the motion sensor pixels M, may be disposed on the edges of the depth sensor pixel group, including depth sensor pixels D. According to an embodiment, the depth sensor pixels D may be arranged on edges of the motion sensor pixels M.

Figure 6:
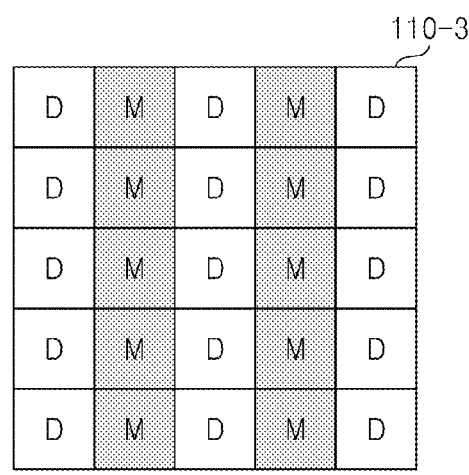
FIG. 6 illustrates another embodiment of the pixel array illustrated in FIG. 2.
Figure 6:
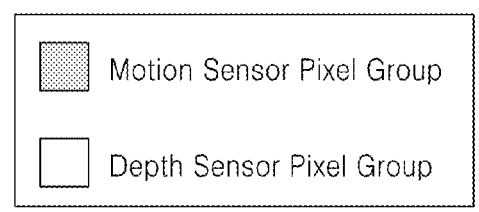

The pixel array 110-3 of FIG. 6 includes a plurality of depth sensor pixels D and a plurality of motion sensor pixels M. In this case, the motion sensor pixels M alternate with the depth sensor pixels D in a row direction.

The motion sensor pixels M may be arranged at regular intervals or at irregular intervals, in the row direction. In other words, at least one depth sensor pixel D may be disposed between two adjacent motion sensor pixels M in the row direction. Alternatively, at least one motion sensor pixel M may be disposed between two adjacent depth sensor pixels D in the row direction.

Figure 7:
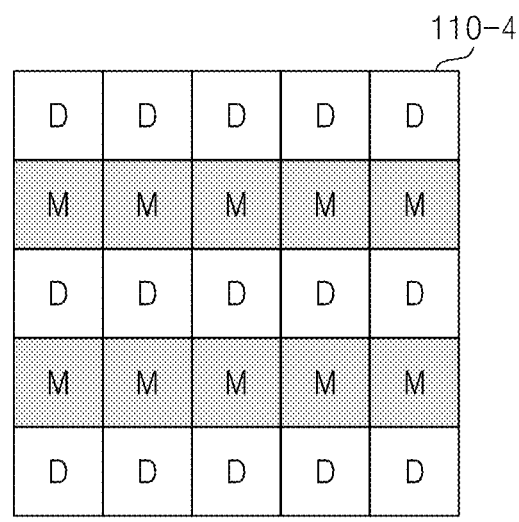
FIG. 7 illustrates still another embodiment of the pixel array illustrated in FIG. 2.
Figure 7:
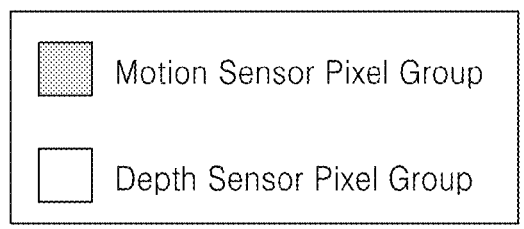

The pixel array 110-4 of FIG. 7 includes a plurality of depth sensor pixels D and a plurality of motion sensor pixels M. In this case, the motion sensor pixels M alternate with the depth sensor pixels D in a column direction.

The motion sensor pixels M may be arranged at regular intervals or at irregular intervals, in the column direction. In other words, at least one depth sensor pixel D may be disposed between two adjacent motion sensor pixels M in the column direction. Alternatively, at least one motion sensor pixel M may be disposed between two adjacent depth sensor pixels D in the column direction.

Figure 8:
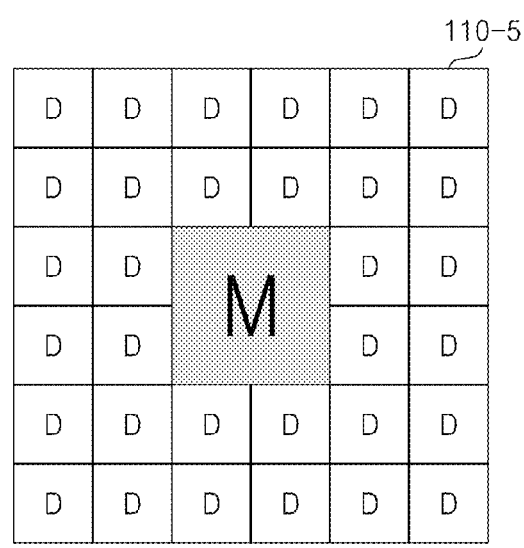
FIG. 8 illustrates still another embodiment of a pixel array illustrated in FIG. 2.
Figure 8:
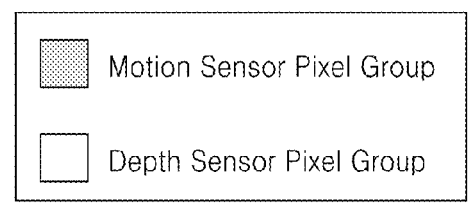

As illustrated in FIG. 8, the pixel array 110-5 includes a motion sensor pixel M and a plurality of depth sensor pixels D. The motion sensor pixel M has a different size from the depth sensor pixels D. According to an embodiment, the motion sensor pixels M, included in each of the pixel arrays 110-1 through 110-4 of FIGS. 4 through 7, may have a different size from the depth sensor pixels D included therein.

Figure 9:
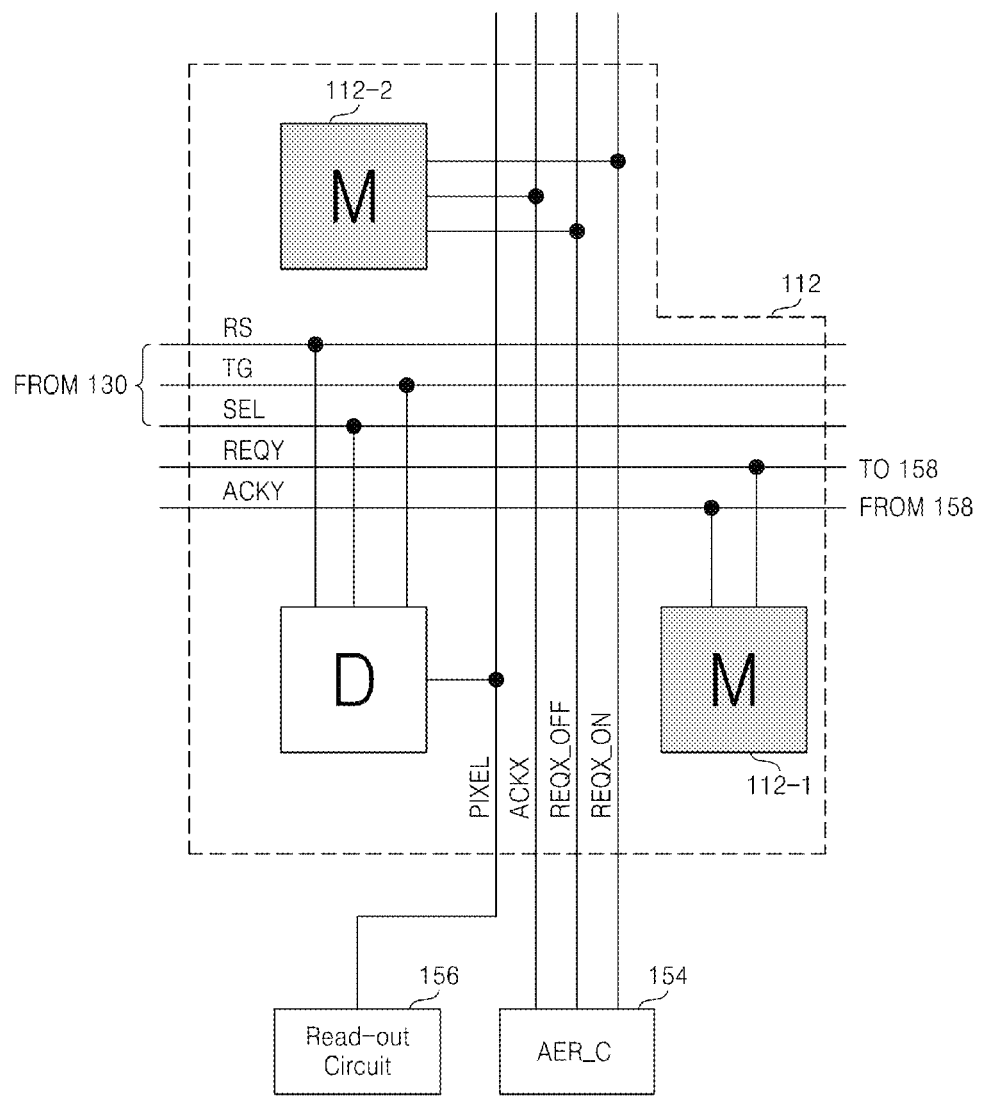
FIG. 9 is a circuit diagram of an embodiment of wirings of the pixel array illustrated in FIG. 4.

FIG. 9 is a circuit diagram of an embodiment of lines of a pixel array 112 illustrated in FIG. 4. FIG. 9 illustrates the pixel array 112, which is a part of the pixel array 110-1 of FIG. 4, a column AER 154, and a read-out circuit 156. The column AER 154 and the read-out circuit 156 may be implemented by using separate circuits.

The pixel array 112 includes a depth sensor pixel D and motion sensor pixels 112-1 and 112-2. Structures and operations of the motion sensor pixels 112-1 and 112-2 are the same as each other. Wirings of the motion sensor pixel 112-1 are the same as those of the motion sensor pixel 112-2.

Wirings in a row direction may include a reset signal line RS, a transmission control signal line TG, a selection signal line SEL, a row AER event signal line REQY, and a row AER reset signal line ACKY. Each of the reset signal line RS, the transmission control signal line TG, and the selection signal line SEL may be connected to the row driver 130 and the depth sensor pixel D.

The row driver 130 may transmit a reset signal, a transmission control signal, and a selection signal to the depth sensor pixel D via the reset signal line RS, the transmission control signal line TG, and the selection signal line SEL, respectively.

The row AER event signal line REQY may be connected to the row AER 158 and the motion sensor pixel 112-1. The motion sensor pixel 112-1 may transmit an on/off event signal to the row AER 158 via the row AER event signal line REQY. The row AER reset signal line ACKY may be connected to the row AER 158 and the motion sensor pixel 112-1. The row AER 158 may transmit a first DVS reset signal to the motion sensor pixel 112-1 via the row AER event signal line REQY.

Wirings in a column direction may include a pixel signal line PIXEL, a column AER on-event signal line REQX_ON, a column AER off-event signal line REQX_OFF, and a column AER reset signal line ACKX.

The pixel signal line PIXEL may be connected to the row driver 156 and the depth sensor pixel D. The depth sensor pixel D may transmit a pixel signal to the read-out circuit 156 via the pixel signal line PIXEL.

The column AER on-event signal line REQX_ON may be connected to the column AER 154 and the motion sensor pixel 112-2. The motion sensor pixel 112-2 may transmit an on-event signal to the column AER 154 via the column AER on-event signal line REQX_ON. The column AER off-event signal line REQX_OFF may be connected to the column AER 154 and the motion sensor pixel 112-2. The motion sensor pixel 112-2 may transmit an off-event signal to the column AER 154 via the column AER off-event signal line REQX_OFF.

The column AER reset signal line ACKX may be connected to the column AER 154 and the motion sensor pixel 112-2. The column AER 154 may transmit a second DVS reset signal to the motion sensor pixel 112-2 via the column AER reset signal line ACKX.

Signals respectively transmitted via the signal lines illustrated in FIG. 9 will be described in more detail later with reference to FIGS. 11 through 12B.

Figure 10:
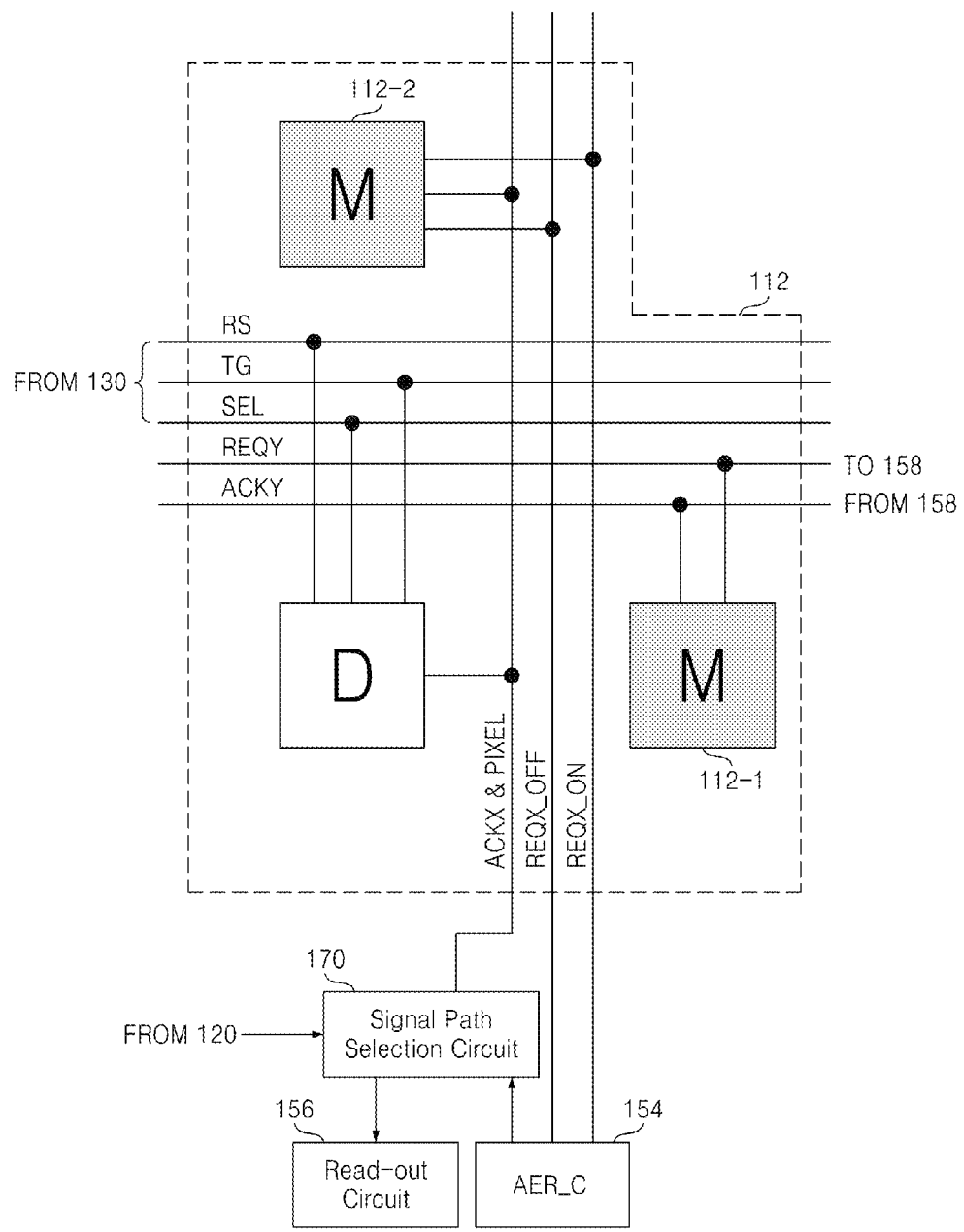
FIG. 10 is a circuit diagram of other embodiment of wirings of the pixel array illustrated in FIG. 4.

FIG. 10 is a circuit diagram of other embodiment of wirings of the pixel array 112 illustrated in FIG. 4. Referring to FIG. 10, the pixel signal line PIXEL and the column AER reset signal line ACKX of FIG. 9 are replaced by a single common signal line ACKX&PIXEL. In other words, the common signal line ACKX&PIXEL is connected to the depth sensor pixel D, the motion sensor pixel 112-2, and a signal path selection circuit 170.

The signal path selection circuit 170 may connect the common signal line ACKX&PIXEL to the read-out circuit 156 or the column AER 154, under the control of the control logic 120. For example, the signal path selection circuit 170 may be implemented by using a switch or a demultiplexer.

According to an embodiment, when the mode selection signal MSEL is in a first level, for example, in a low level, the signal path selection circuit 170 may connect the common signal line ACKX&PIXEL to the column AER 154 under the control of the control logic 120. Accordingly, the common signal line ACKX&PIXEL may operate as the column AER reset signal line ACKX. On the other hand, when the mode selection signal MSEL is in a second level, for example, in a high level, the signal path selection circuit 170 may connect the common signal line ACKX&PIXEL to the read-out circuit 156 under the control of the control logic 120. Accordingly, the common signal line ACKX&PIXEL may operate as the pixel signal line PIXEL.

Figure 11:
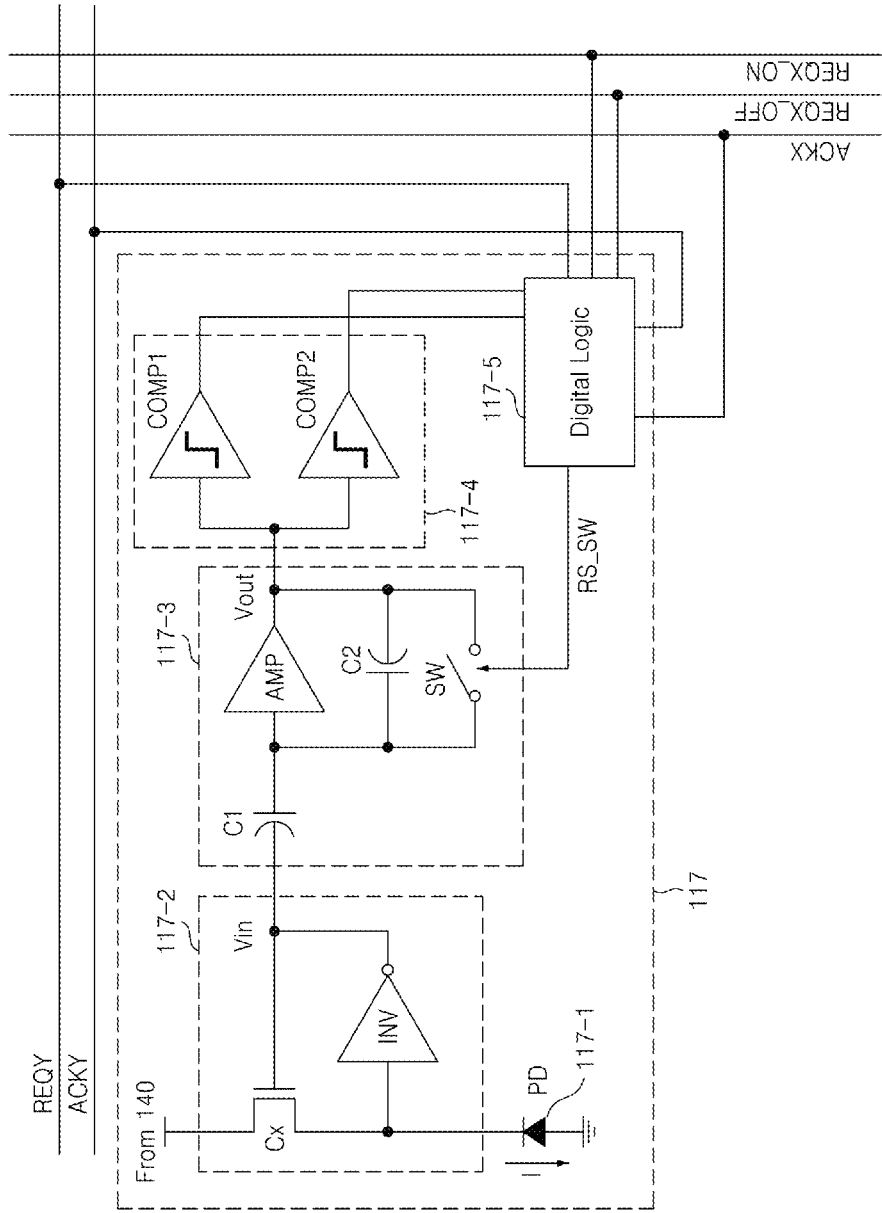
FIG. 11 is a circuit diagram of an embodiment of a motion sensor pixel illustrated in FIG. 9 or 10.

FIG. 11 is a circuit diagram of an embodiment of the motion sensor pixels 112-1 and 112-2 illustrated in FIG. 9 or 10. Referring to FIGS. 9 through 11, each of the motion sensor pixels 112-1 and 112-2 of FIG. 9 or 10 may be a DVS pixel 117. In other words, structures and operations of the motion sensor pixels 112-1 and 112-2 and the DVS pixel 117 may be substantially the same as one another.

The DVS pixel 117 may include a photo diode (PD) 117-1, a current-to-voltage (I/V) converter 117-2, an amplification circuit 117-3, a comparator circuit 117-4, and a digital logic 117-5.

The PD 117-1 is an example of a photoelectric conversion device, and may be implemented by using a photo transistor, a photo gate, a pinned photo diode (PPD), or a combination of two or more of these devices. The PD 117-1 may generate a photo current I according to the intensity of incident light.

The I/V converter 117-2 may include a converting transistor Cx and an inverter INV. The converting transistor Cx may receive power from the motion sensor pixel enable controller 140. For example, when a motion sensor pixel group is disabled or deactivated, the motion sensor pixel enable controller 140 may disable the converting transistor Cx by supplying a voltage having a predetermined level or less to the converting transistor Cx. The inverter INV may output a first voltage Vin by inverting a voltage of a first terminal of the PD 117-1.

The I/V converter 117-2 may detect the photoelectric current I flowing in the PD 117-1, and convert the photo current I to the first voltage Vin according to a result of the detection.

The amplification circuit 117-3 may include a first capacitor C1, a second capacitor C2, an amplifier AMP, and a reset switch SW. The amplification circuit 117-3 may output a second voltage Vout associated with a variation of the first voltage Vin over time, based on the first voltage Vin.

The reset switch SW may reset the second voltage Vout as a reset voltage under the control of the digital logic 117-5.

The comparison circuit 117-4 may include a first comparator COMP1 and a second comparator COMP2. The first comparator COMP1 may compare the second voltage Vout with an on-threshold voltage, and generate an on-event signal according to a result of the comparison. The second comparator COMP2 may compare the second voltage Vout with an off-threshold voltage, and generate an off-event signal according to a result of the comparison.

The comparator circuit 117-4 may generate the on-event signal or the off-event signal, when a speed of change of a shading sensed by the DVS pixel 117 is a predetermined level or greater. For example, the on-event signal may be in a high level, when the shading sensed by the DVS pixel 117 rapidly brightens. For example, the off-event signal may be in a high level, when the shading sensed by the DVS pixel 117 rapidly darkens. The on-event signal and/or the off-event signal may be transmitted to the digital logic 117-5.

The digital logic 117-5 may generate an event signal according to the on-event signal and the off-event signal, output from the comparator circuit 117-4. For example, the digital logic 117-5 may be implemented by using an OR gate circuit, and the OR gate circuit may perform an OR operation on an on-event signal and an off-event signal. When the on-event signal or the off-event signal is in a high level, the OR gate circuit may generate an event signal. The event signal may be transmitted to the row AER 158 via the row AER event signal line REQY.

According to an embodiment, the OR gate circuit may be implemented outside the DVS pixel 112-1, 112-2, or 117, or inside the row AER 158.

The digital logic 117-5 may transmit the received on-event signal to the column AER 154 via the column AER on-event signal line REQX_ON. The digital logic 117-5 may transmit the received off-event signal to the column AER 154 via the column AER off-event signal line REQX_OFF.

The digital logic 117-5 may generate a reset switch signal RS_SW based on the on-event signal and the off-event signal, output by the comparator circuit 117-4. For example, when the digital logic 117-5 may be implemented using an OR gate circuit, the OR gate circuit may generate the reset switch signal RS_SW when either the on-event signal or the off-event signal is at a high level. The reset switch SW may reset the second voltage Vout according to the reset switch signal RS_SW. According to an embodiment, the OR gate circuit may be implemented outside the DVS pixel 112-1, 112-2, or 117, or inside the row AER 158.

According to another embodiment, the OR gate circuit for generating the event signal and the OR gate circuit for generating the reset switch signal RS_SW may be implemented using an identical OR gate circuit.

The digital logic 117-5 may receive the first DVS reset signal and the second DVS reset signal from the row AER 158 and the column AER 154, respectively, via the row AER reset signal line ACKY and the column AER reset signal line ACKX, respectively. The digital logic 117-5 may generate the reset switch signal RS_SW according to the first DVS reset signal received from the row AER 158 and the second DVS reset signal received from the column AER 154.

For example, the digital logic 117-5 may be implemented using an AND gate circuit. The AND gate circuit may generate the reset switch signal RS_SW in a high level, when both the first DVS reset signal received from the row AER 158 and the second DVS reset signal received from the column AER 154 are at high levels. According to an embodiment, the AND gate circuit may be implemented outside the DVS pixel 112-1, 112-2, or 117.

The digital logic 117-5 may be implemented by using hardware capable of performing a Boolean function.

Figure 12A:
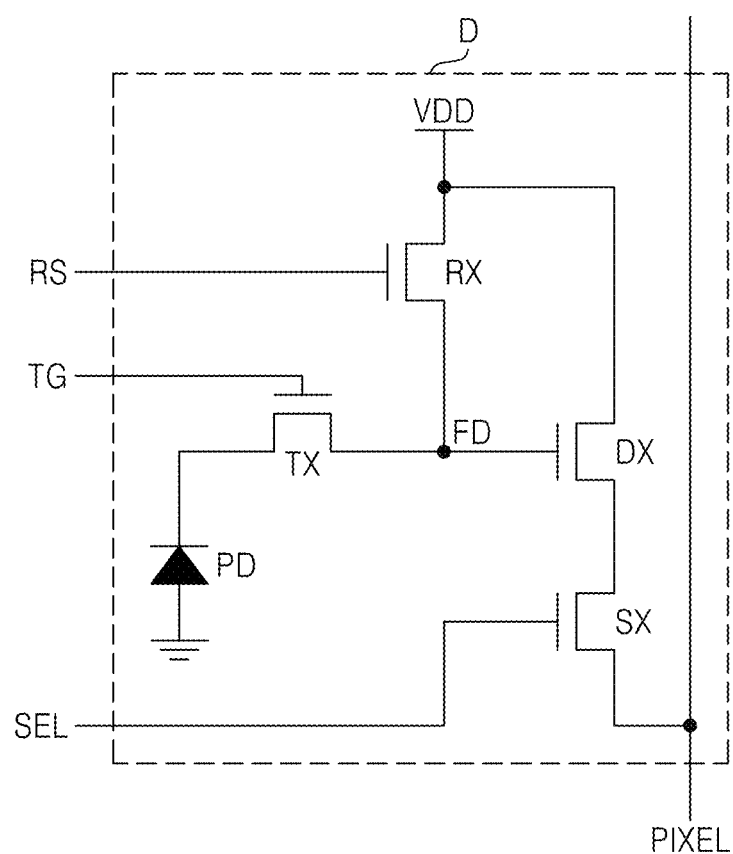
FIG. 12A is a circuit diagram of an embodiment of a depth sensor pixel illustrated in FIG. 9 or 10.

FIG. 12A is a circuit diagram of a depth sensor pixel D, which is an embodiment of the depth sensor pixel D illustrated in FIG. 9 or 10. Referring to FIGS. 9, 10, and 12A, a TOF sensor pixel using a TOF method, for example, the depth sensor pixel sensor D, may be implemented by using a 1-tap structure including 4 transistors.

The depth sensor pixel sensor D may include a photo diode PD and four transistors, namely, a transmission transistor TX, a reset transistor RX, a drive transistor DX, and a select transistor SX. The photo diode PD generates photo charges according to incident light. The photo diode PD may be implemented using a photo transistor, a photo gate, a PPD, etc.

The transfer transistor TX transmits the photo charges generated by the photo diode PD to a floating diffusion region FD, in response to a transmission control signal received via a transmission control signal line TG. The reset transistor RX may reset the floating diffusion region FD in response to a reset signal received via a reset signal line RS. The drive transistor DX may perform a function of a source follower buffer amplifier that operates in response to a voltage of the floating diffusion region FD. The select transistor SX transmits a pixel signal corresponding to the photo charges generated by the photo diode PD to the pixel signal line PIXEL, in response to a selection signal received via a selection signal line SEL.

Although the depth sensor pixel D including the photo diode PD and the four transistors TX, RX, DX, and SX are illustrated in FIG. 12A for convenience, the depth sensor pixel D may include a PD and three transistors or include a PD and five transistors.

Figure 12B:
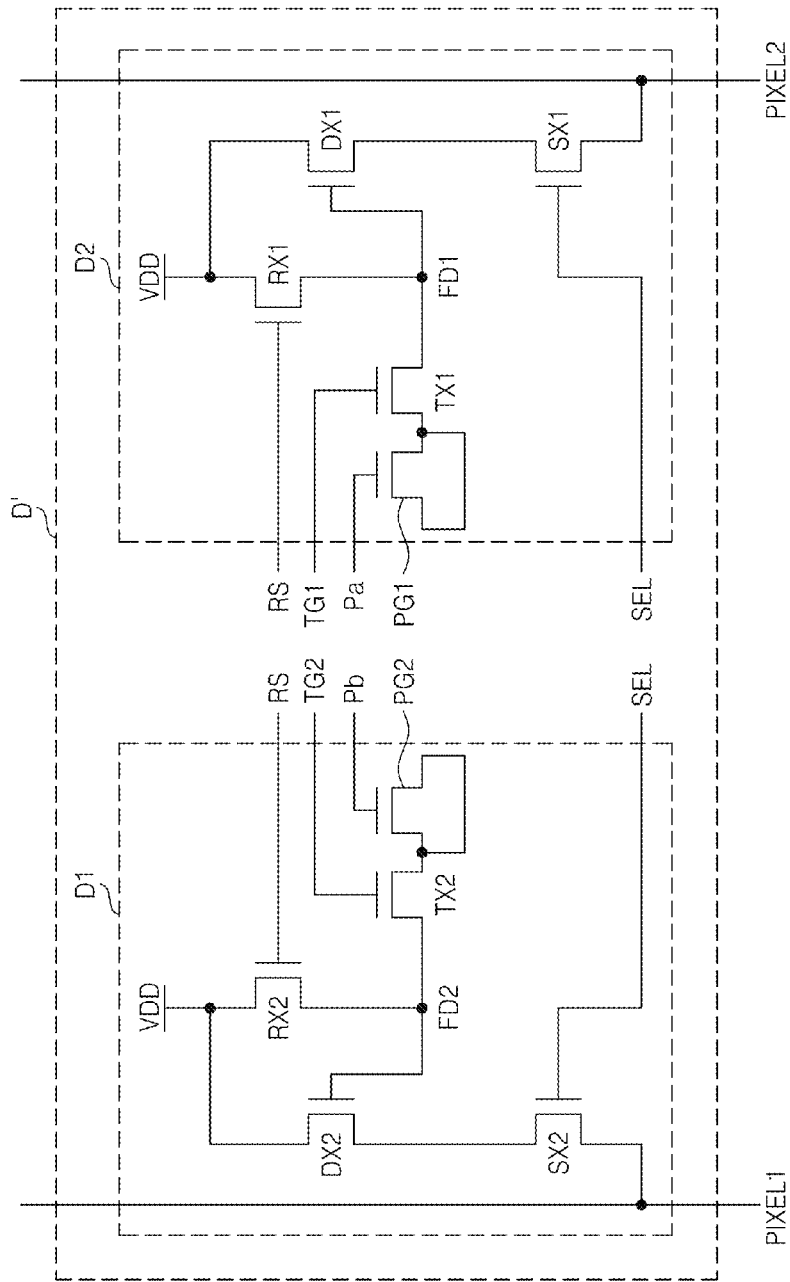
FIG. 12B is a circuit diagram of other embodiment of the depth sensor pixel illustrated in FIG. 9 or 10.

FIG. 12B is a circuit diagram of a depth sensor pixel D', which is another embodiment of the depth sensor pixel D of FIG. 9 or 10. Referring to FIGS. 2, 9, 10, 12A, and 12B, the depth sensor pixel D' uses a TOF method and may be implemented in a 2-tap structure, including a first depth sensor pixel D1 and a second depth sensor pixel D2.

The first depth sensor pixel D1 and the second depth sensor pixel D2 have substantially the same structure. The structure and operation of the depth sensor pixel D of FIG. 12A are substantially the same as those of each of the depth sensor pixels D1 and D2, except for first and second photo gates PG1 and PG2.

A difference between phases of a first gate signal Pa and a second gate signal Pb may be 180°. The first photo gate PG1 is gated according to the first gate signal Pa, and the second photo gate PG2 is gated according to the second gate signal Pb.

Referring to FIGS. 2 and 12B, when each depth sensor pixel D included in the pixel array 110 is implemented by using the depth sensor pixel D' having a 2-tap structure, the control logic 120 may include a circuit for supplying the first gate signal Pa and the second gate signal Pb to each depth sensor pixels D included in the pixel array 110.

Referring to FIGS. 2, 9, 10, and 12B, when each depth sensor pixel D included in the pixel array 110 is implemented by using the depth sensor pixel D' having a 2-tap structure, the pixel array 110 may include the selection signal line SEL, two pixel signal lines PIXEL1 and PIXEL2, two transmission control signal lines TG1 and TG2, signal lines for transmitting the first and second gate signals Pa and Pb, and the reset signal line RS. However, the embodiments are not limited. For example, the pixel signal line PIXEL of FIG. 9 may be replaced by the pixel signal lines PIXEL1 and PIXEL2. In this case, the pixel signal line PIXEL1 or PIXEL2 and the column AER reset signal line ACKX may be shared.

Figure 13:
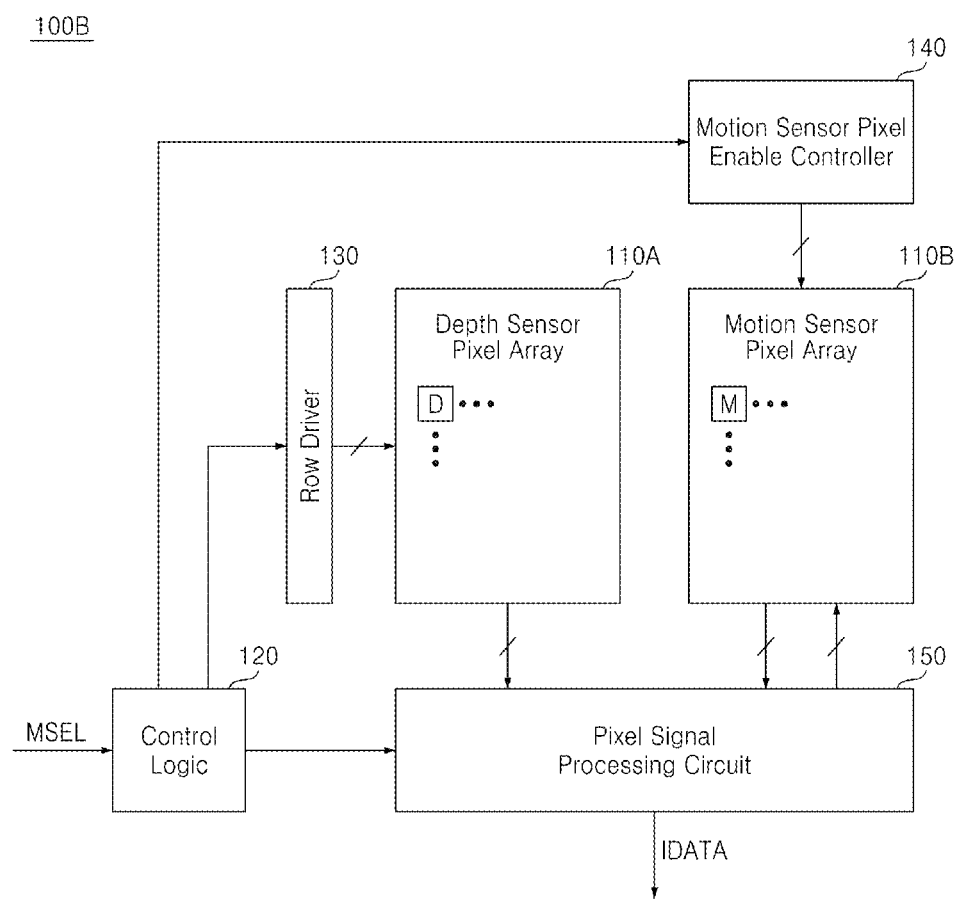
FIG. 13 is a block diagram of other embodiment of the image sensor included in the image processing system of FIG. 1.

FIG. 13 is a block diagram of an image sensor 100B, which is another embodiment of the image sensor 100 of FIG. 1. Referring to FIGS. 1 and 13, the image sensor 100B includes a depth sensor pixel array 110A and a motion sensor pixel array 110B. The depth sensor pixel array 110A includes only depth sensor pixels D, and the motion sensor pixel array 110B includes only motion sensor pixels M.

The row driver 130 may activate the depth sensor pixels D included in the depth sensor pixel array 110A, under the control of the control logic 120. The motion sensor pixel enable controller 140 may control whether to activate each of the motion sensor pixels M included in the motion sensor pixel array 110B, under the control of the control logic 120.

Figure 14:
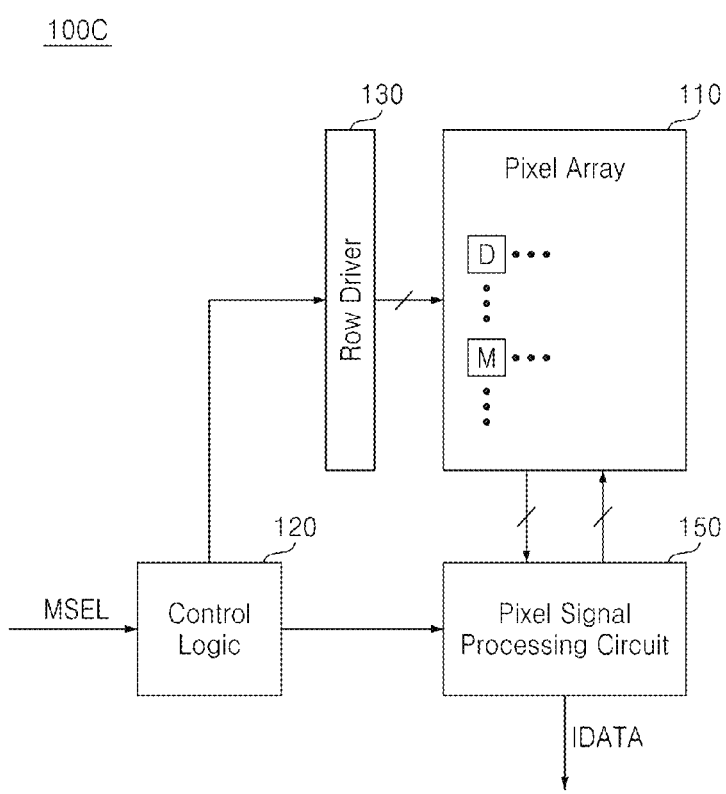
FIG. 14 is a block diagram of another embodiment of the image sensor included in the image processing system of FIG. 1.
Figure 15:
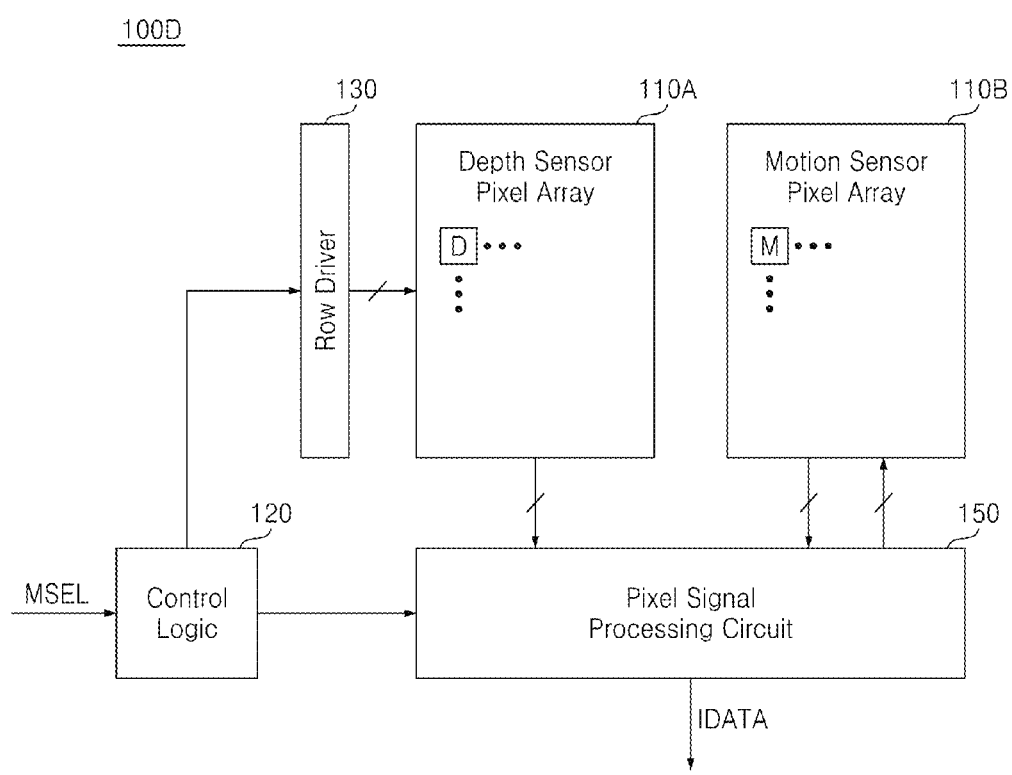
FIG. 15 is a block diagram of still another embodiment of the image sensor included in the image processing system of FIG. 1.

FIG. 14 is a block diagram of an image sensor 100C which is another embodiment of the image sensor 100 of FIG. 1. FIG. 15 is a block diagram of an image sensor 100D, which is still another embodiment of the image sensor 100 of FIG. 1. Referring to FIGS. 1, 14, and 15, the image sensor 100C or 100D may not include the motion sensor pixel enable controller 140.

The pixel signal processing circuit 150 may control output of each of a plurality of motion sensor pixels M under the control of the control logic 120. In other words, when the motion sensor pixels M are enabled, the pixel signal processing circuit 150 may control output of each of the depth sensor pixels D and the motion sensor pixels M.

According to an embodiment, when each of the motion sensor pixels M is implemented by using a DVS pixel, each of the motion sensor pixels M may not output an event signal according to a signal received from the pixel signal processing circuit 150.

Figure 16:
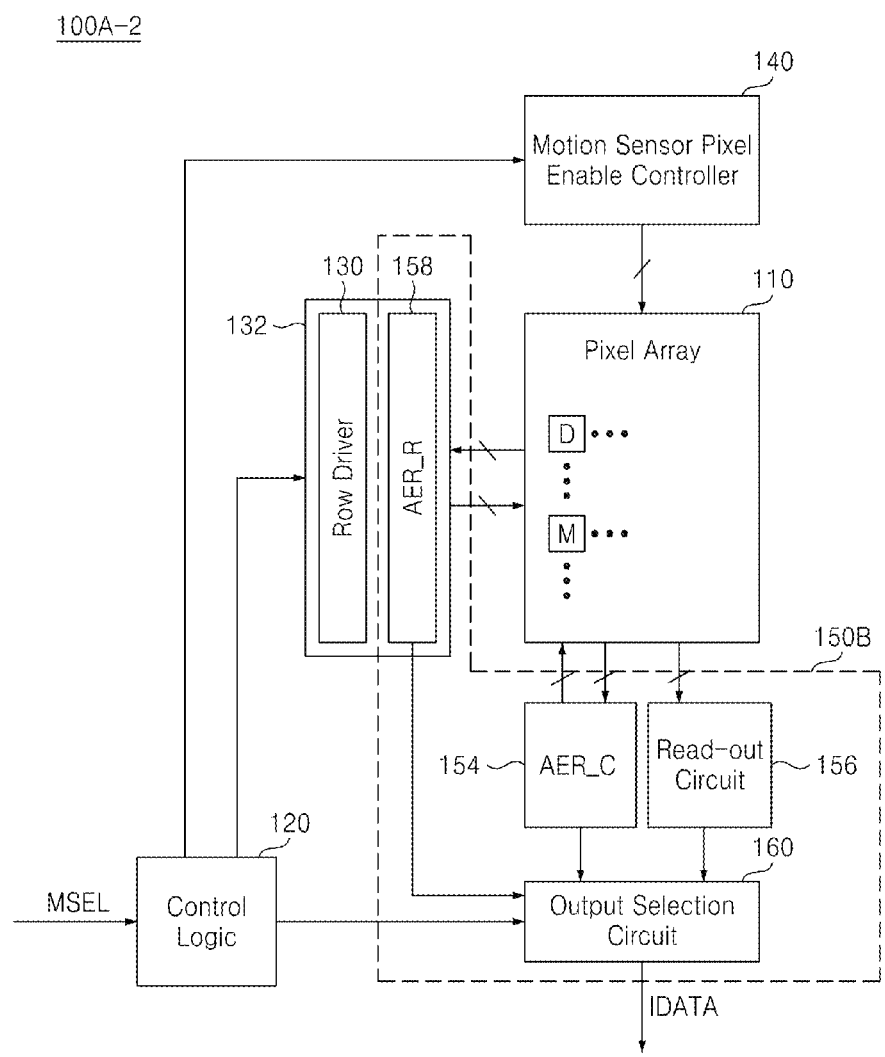
FIG. 16 is a block diagram of an image sensor including other embodiment of the pixel signal processing circuit illustrated in FIG. 2.
Figure 17:
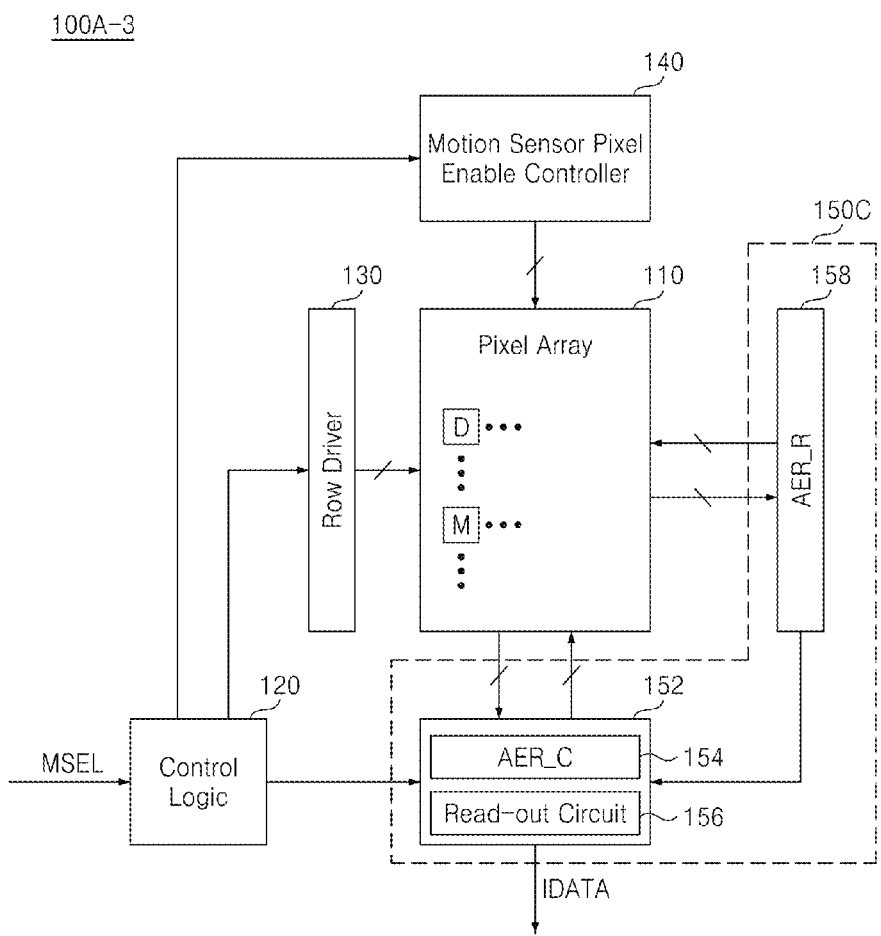
FIG. 17 is a block diagram of an image sensor including another embodiment of the pixel signal processing circuit illustrated in FIG. 2.

FIG. 16 is a block diagram of an image sensor 100A-2 including a pixel signal processing circuit 150B, which is another embodiment of the pixel signal processing circuit 150 of FIG. 2. FIG. 17 is a block diagram of an image sensor 100A-3 including a pixel signal processing circuit 150C, which is another embodiment of the pixel signal processing circuit 150 of FIG. 2. Referring to FIGS. 2, 16, and 17, each of the image sensor 100A-2 or 100A-3 may include motion sensor pixels implemented by using DVS pixels.

Referring to FIG. 16, the column AER 154 and the read-out circuit 156 included in the pixel signal processing circuit 150B may be implemented by using separate circuits. The row AER 158 included in the pixel signal processing circuit 150B may be implemented on the same side as the row driver 130.

A row AER & row driver block 132 may include the row driver 130 and the row AER 158. This means that the row AER & row driver block 132 may be divided into the row AER 158 and the row driver 130 functionally and logically. However, embodiments are not limited.

Referring to FIG. 17, the pixel signal processing circuit 150C may include a column AER & read-out circuit block 152 and the row AER 158.

The column AER & read-out circuit block 152 may include the column driver 154 and the read-out circuit 156. This means that the column AER & read-out circuit block 152 may be divided into the column AER 154 and the read-out circuit 156 functionally and logically. However, embodiments are not limited.

According to an embodiment, the column AER & read-out circuit block 152 may process an event signal output from each motion sensor pixel M and also process a pixel signal output from each depth sensor pixel D, according to an identical method or logic. In this case, a block for performing analog-digital conversion (ADC) on the pixel signal output from each depth sensor pixel D may be installed inside or outside the column AER & read-out circuit block 152.

The row AER 158 may be implemented on the opposite side of the row driver 130. A row address value of a motion sensor pixel that outputs an event signal according to a change in light amount may be transmitted from the row AER 158 to the column AER & read-out circuit block 152.

Figure 18:
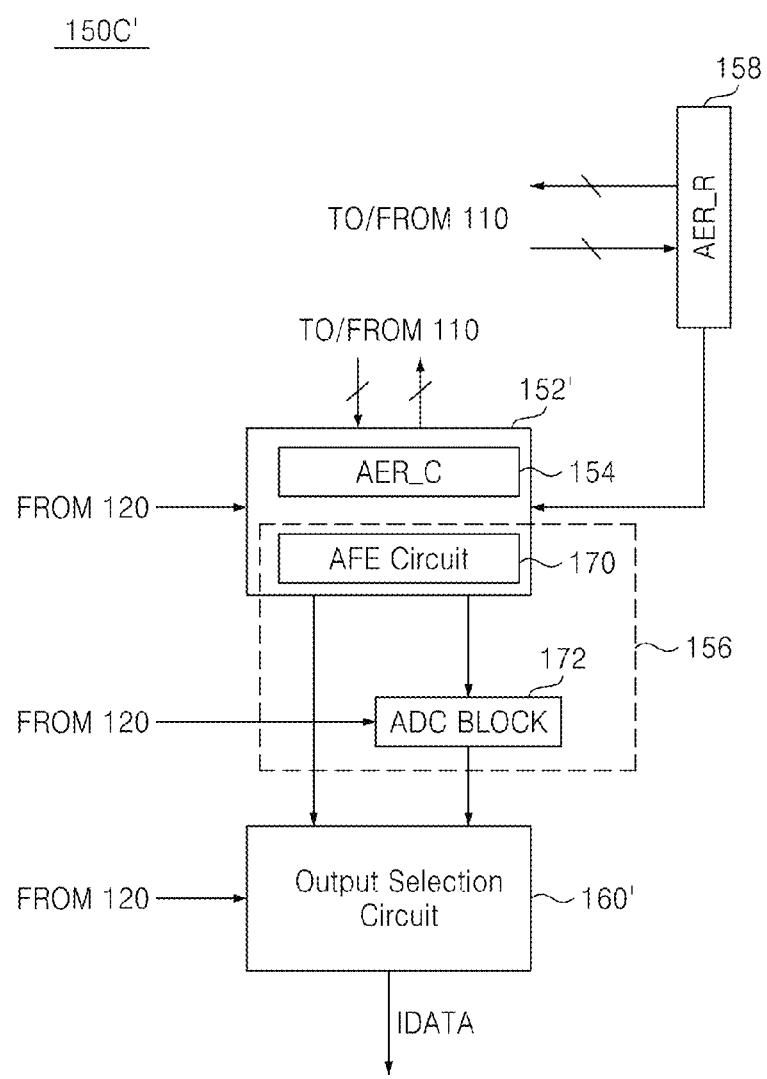
FIG. 18 is a block diagram of a modification of a pixel signal processing circuit illustrated in FIG. 17.

FIG. 18 is a block diagram of a pixel signal processing circuit 150C', which is a modification of the pixel signal processing circuit 150C of FIG. 17. Referring to FIGS. 17 and 18, the pixel signal processing circuit 150C' may include a column AER & analog front end (AFE) circuit block 152', the row AER 158, an output selection circuit 160', and an analog-to-digital converter (ADC) block 172.

The column AER & AFE circuit block 152' may include the column AER 154 and an AFE circuit 170. The AFE circuit 170 may denote a circuit including the components that perform operations previous to ADC from among the components included in the read-out circuit 156.

The column AER & AFE circuit block 152' implies that it may be functionally and logically divided into the column AER 154 and the read-out circuit 170. However, embodiments are not limited. According to an embodiment, the column AER & AFE circuit block 152' may process an event signal output from each motion sensor pixel M and a pixel signal output from each depth sensor pixel D according to an identical method or logic.

The column AER & AFE circuit block 152' may process an event signal output from each motion sensor pixel M and a pixel signal output from each depth sensor pixel D. The column AER & AFE circuit block 152' may transmit a result of the processing that requires ADC (for example, a result of the processing on the pixel signal output from each depth sensor pixel D) to the ADC block 172, and may transmit a result of the processing that does not require ADC (for example, a result of the processing on the event signal output from each motion sensor pixel M) to the output selection circuit 160'.

The ADC block 172 may perform ADC on the processing result received from the column AER & AFE circuit block 152' (for example, the result of the processing on the pixel signal output from each depth sensor pixel D) and transmit a digital signal corresponding to a result of the ADC to the output selection circuit 160'. According to an embodiment, the ADC block 172 may include a correlated double sampling (CDS) circuit, a ramp signal generator, a comparator, and a counter, which are not shown.

The output selection circuit 160' may select and process either a signal received from the column AER & AFE circuit block 152' or the digital signal received from the ADC block 172 under the control of the control logic 120, and output a result of the processing as the image data IDATA.

Figure 19:
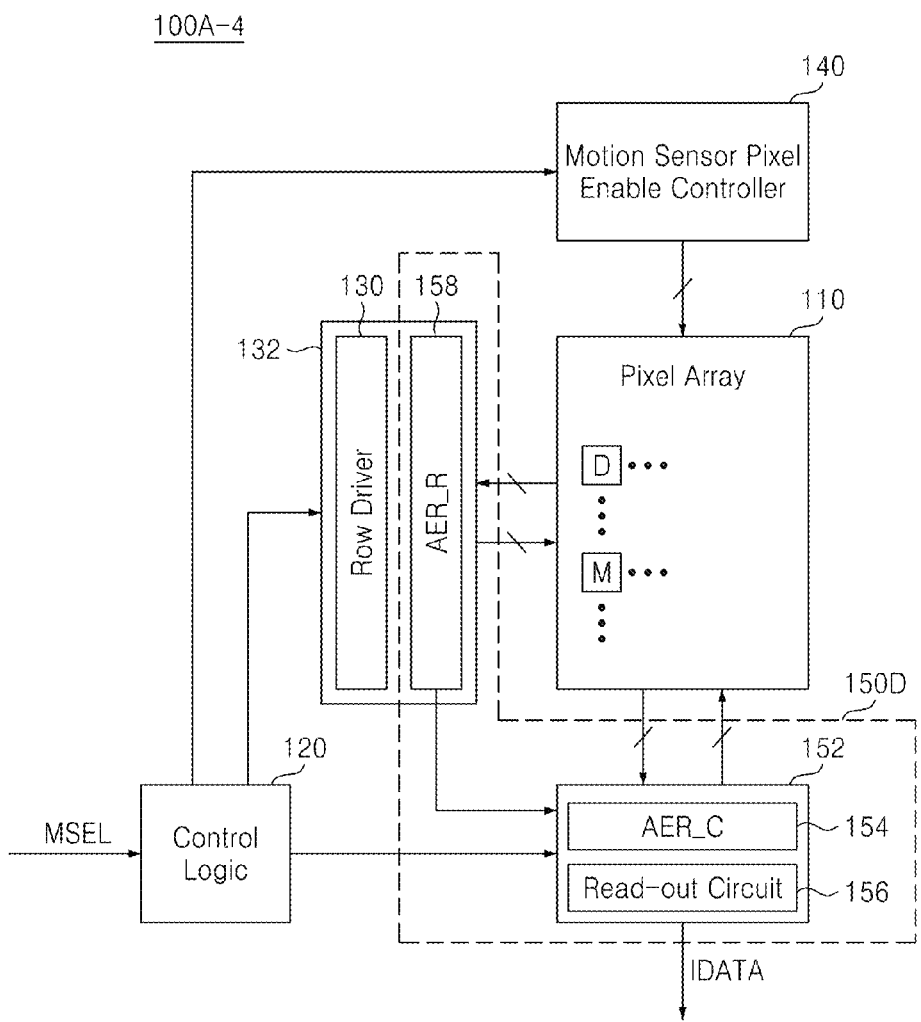
FIG. 19 is a block diagram of an image sensor including another embodiment of the pixel signal processing circuit illustrated in FIG. 2.
Figure 20:
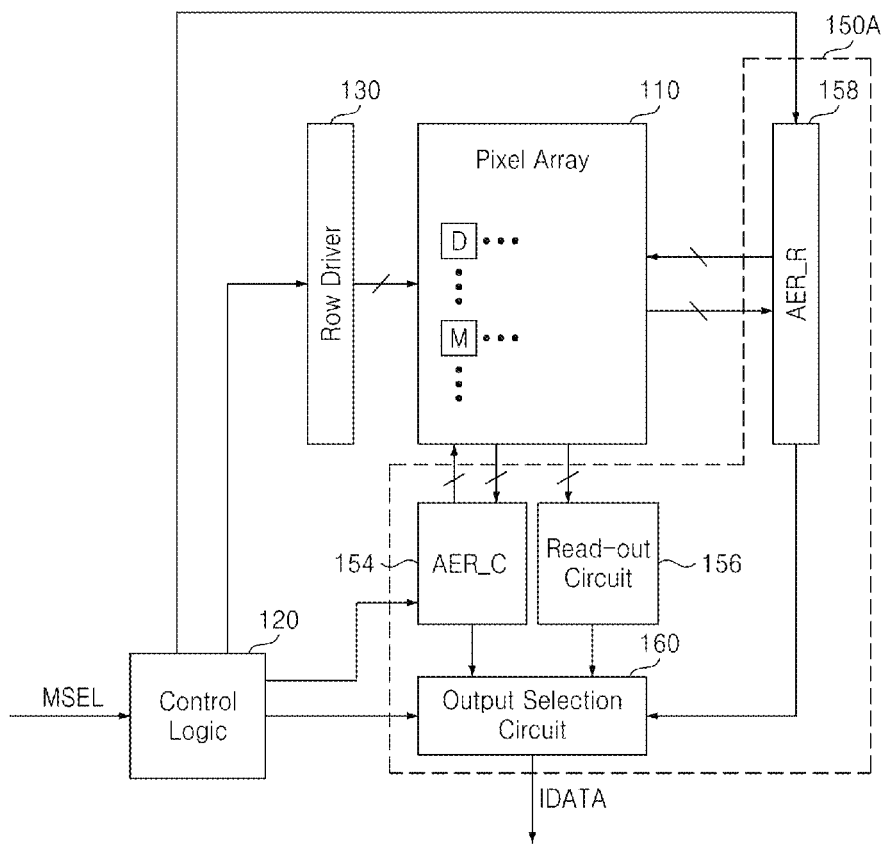
FIG. 20 is a block diagram of an image sensor including an embodiment of a pixel signal processing circuit illustrated in FIG. 14.
Figure 21:
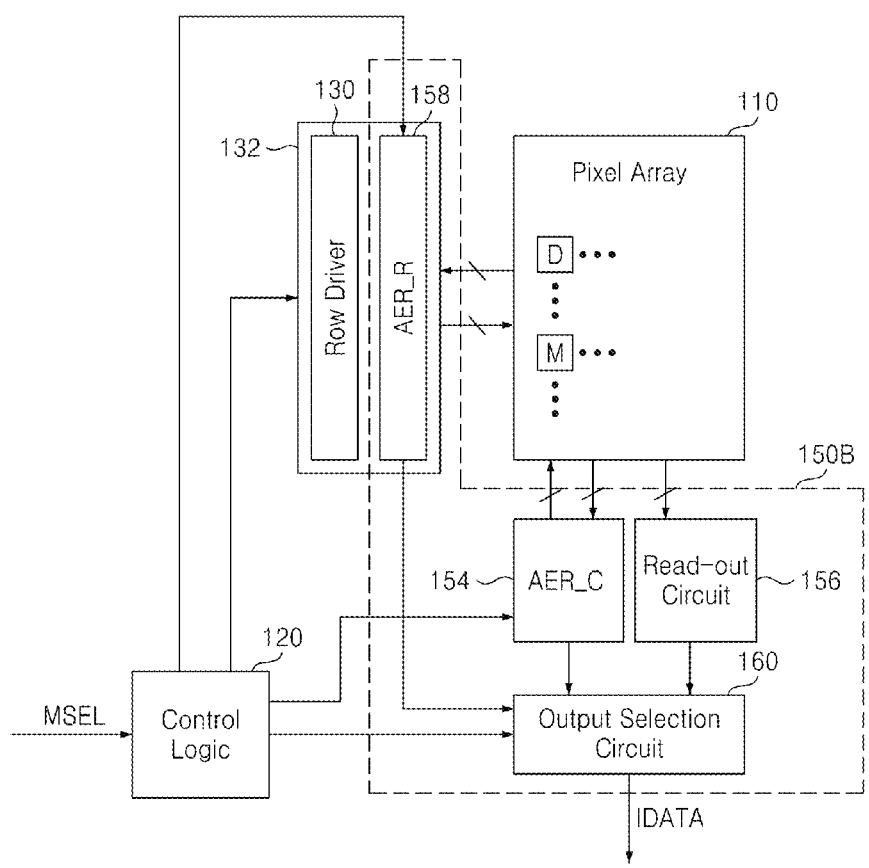
FIG. 21 is a block diagram of an image sensor including other embodiment of the pixel signal processing circuit illustrated in FIG. 14.
Figure 22:
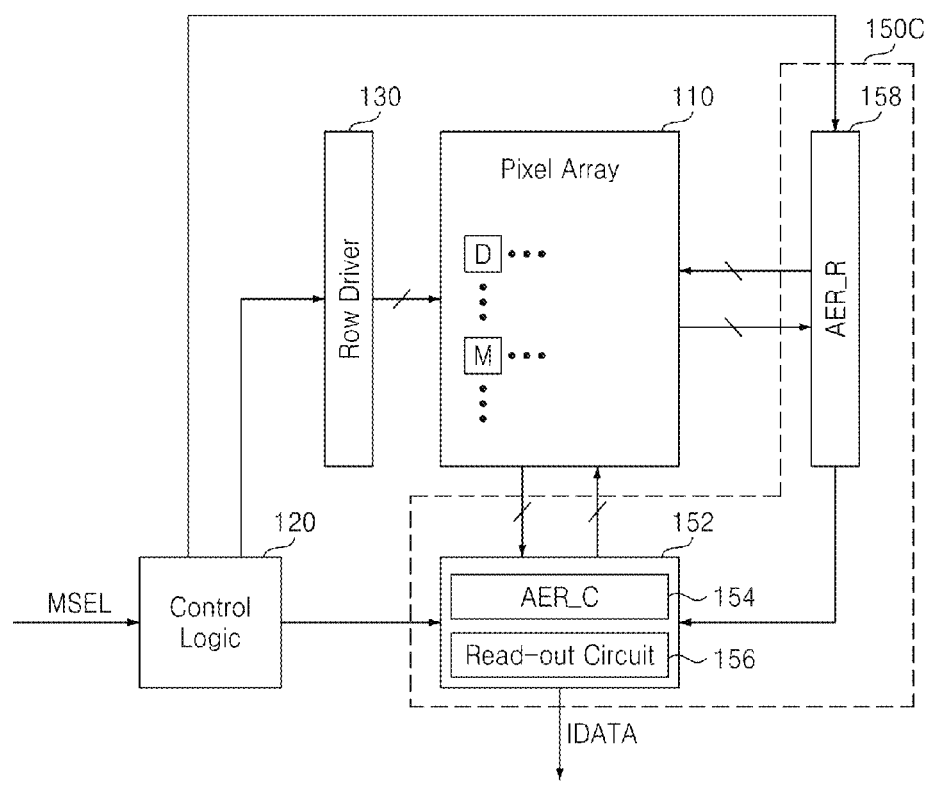
FIG. 22 is a block diagram of an image sensor including another embodiment of the pixel signal processing circuit illustrated in FIG. 14.
Figure 23:
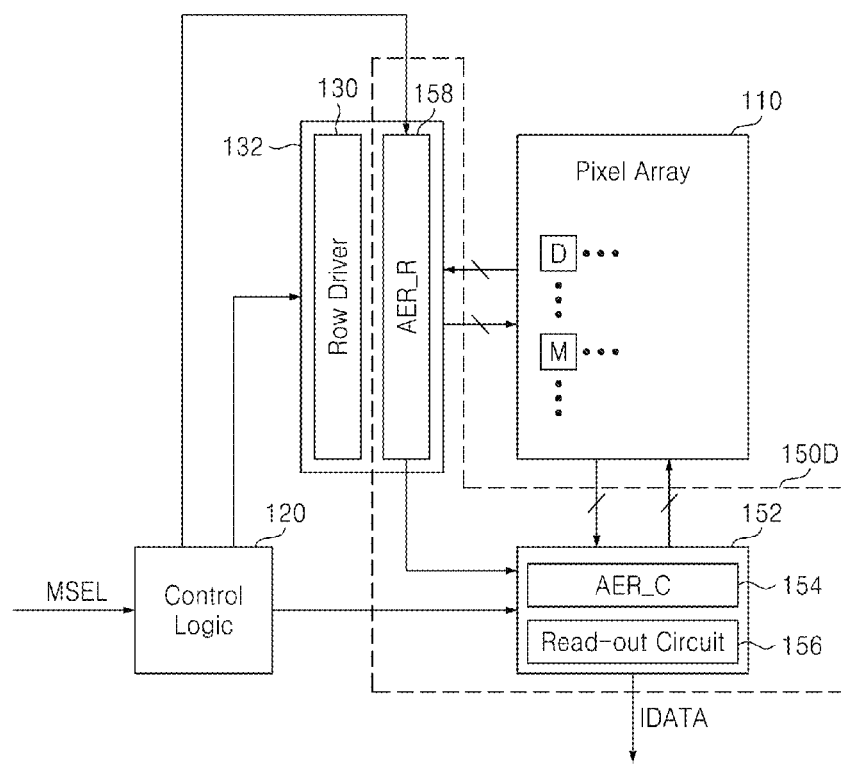
FIG. 23 is a block diagram of an image sensor including still another embodiment of the pixel signal processing circuit illustrated in FIG. 14.

FIG. 19 is a block diagram of an image sensor 100A-4 including a pixel signal processing circuit 150D, which is another embodiment of the pixel signal processing circuit 150 of FIG. 2. The row AER 158, included in the pixel signal processing circuit 150D, may be implemented on the same side as the row driver 130.

The row AER & row driver block 132 may include the row driver 130 and the row AER 158. The row AER & row driver block 132 implies that it may be divided into the row AER 158 and the row driver 130 functionally and logically. However, the embodiments are not limited.

FIGS. 20 through 23 are block diagrams of image sensors 100C-1 through 100C-4 including the pixel signal processing circuits 150A through 150D, respectively, which are embodiments of the pixel signal processing circuit 150 of FIG. 14. Referring to FIGS. 14, and 20-23, each of the image sensors 100C-1 through 100C-4 includes a plurality of motion sensor pixels M implemented by using DVS pixels, and does not include the motion sensor pixel enable controller 140 of FIG. 2.

When the motion sensor pixels M, which are included in the pixel array 110 of each of the image sensors 100C-1 through 100C-4, are enabled, the column AER 154 and the row AER 158 may control the outputs of the motion sensor pixels M.

Referring to FIGS. 11 and 20-23, the column AER 154 and the row AER 158 maintain the voltage Vout of a node of each motion sensor pixel M, which is used as a criteria for generating each event signal, in an initial state (for example, a reset state) under the control of the control logic 120. Accordingly, each motion sensor pixel M does not generate an event signal.

For example, when the depth sensor pixels D are enabled according to the mode selection signal MSEL, the column AER 154 and the row AER 158 may control each motion sensor pixel M to output no event signals, under the control of the control logic 120.

Figure 24:
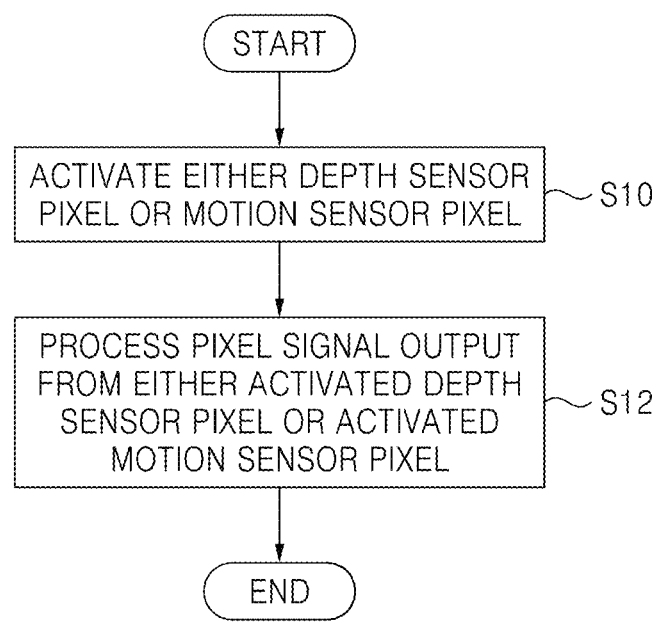
FIG. 24 is a flowchart of a method of operating an image sensor chip, according to an embodiment.

FIG. 24 is a flowchart of a method of operating an image sensor chip, according to an embodiment. Referring to FIGS. 1-3 and 13-24, the control logic 120 may activate either a depth sensor pixel D or a motion sensor pixel M, based on the mode selection signal MSEL, in operation S10.

According to an embodiment, the mode selection signal MSEL may be generated by the CPU 210, according to a result of an analysis on a user input detected by the peripheral circuit 220. According to an embodiment, the control logic 120 may activate the depth sensor pixel D using the row driver 130, and the control logic 120 may activate the motion sensor pixel M using the motion sensor pixel enable controller 140.

The pixel signal processing circuit 150 may process a pixel signal output by either the activated depth sensor pixel D or the activated motion sensor pixel M, in operation S12.

Figure 25:
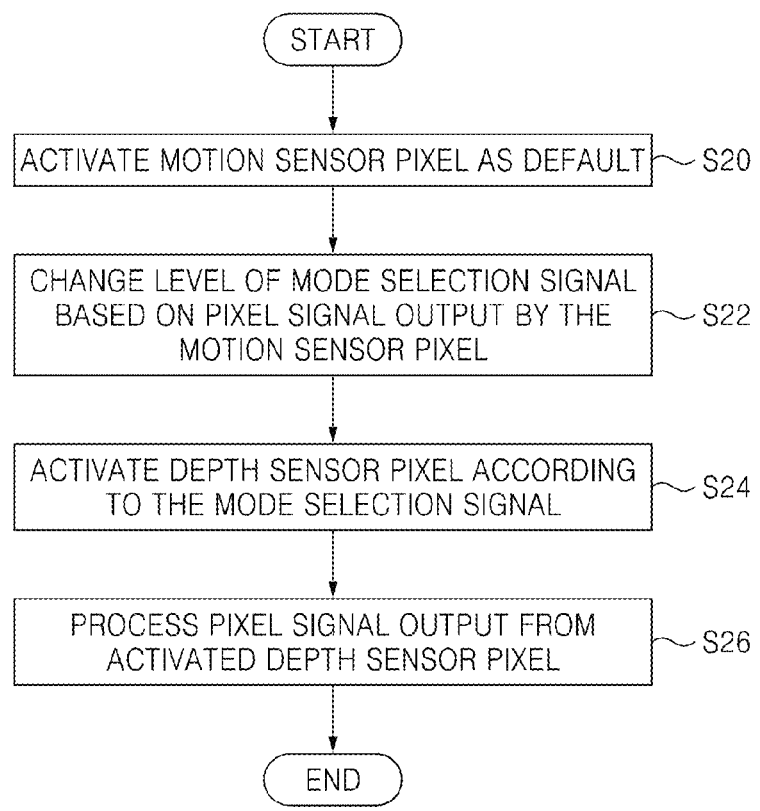
FIG. 25 is a flowchart of a method of operating an image sensor chip, according to other embodiment.

FIG. 25 is a flowchart of a method of operating an image sensor chip, according to another embodiment. Referring to FIGS. 1-3 and 13-25, when power is supplied to the image processing system 10, the CPU 210 may output the mode selection signal MSEL in a default level. For example, the control logic 120 may activate a motion sensor pixel M as a default, based on the mode selection signal MSEL, in operation S20.

The pixel signal output by the activated motion sensor pixel M may be processed by the pixel signal processing circuit 150, and a signal obtained by the processing may be supplied as the image data IDATA to the ISP 200. The ISP 200 may process the image data IDATA to generate the processed image data IDATA', and may transmit the processed image data IDATA' to the CPU 210. The CPU 210 may change the level of the mode selection signal MSEL based on the processed image data IDATA', in operation S22. In other words, the CPU 210 may change the level of the mode selection signal MSEL based on the pixel signal output by the motion sensor pixel M.

Since operations S24 and S26 of FIG. 25 are substantially the same as operations S10 and S12 of FIG. 24, a detailed description is omitted.

Figure 26:
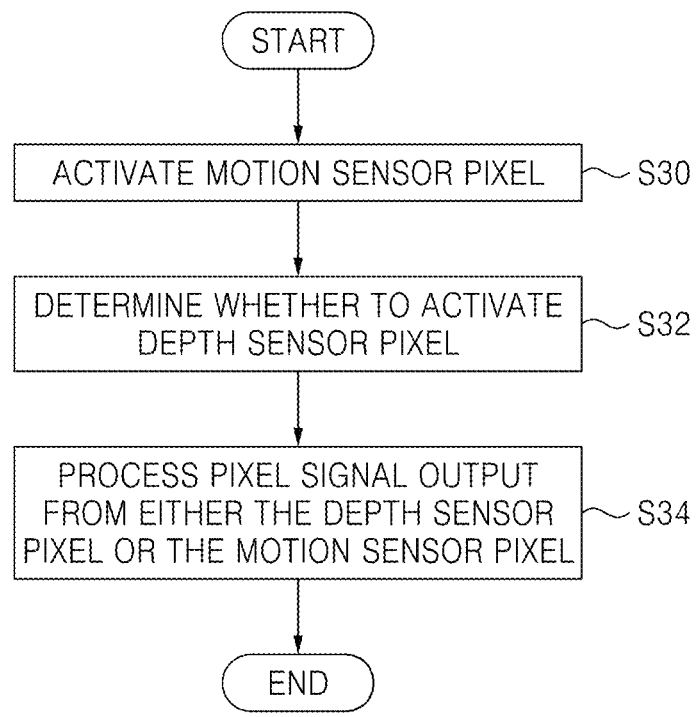
FIG. 26 is a flowchart of a method of operating an image sensor chip, according to another embodiment.

FIG. 26 is a flowchart of a method of operating an image sensor chip, according to another embodiment. Referring to FIGS. 2, 3, 13-23, and 26, the motion sensor pixel enable controller 140 may activate a motion sensor pixel M, in operation S30.

The control logic 120 may determine whether to activate a depth sensor pixel D, based on the mode selection signal MSEL, in operation S32.

The pixel signal processing circuit 150 may process a pixel signal output by either the depth sensor pixel D or the motion sensor pixel M, in operation S34. According to an embodiment, when the depth sensor pixel D is activated, the pixel signal processing circuit 150 may process the pixel signal output by the depth sensor pixel D. Further, when the depth sensor pixel D is deactivated, the pixel signal processing circuit 150 may process the pixel signal output by the motion sensor pixel M.

According to another embodiment, when the depth sensor pixel D is activated, the output selection circuit 160 may select and process either the pixel signal output by the motion sensor pixel M or the pixel signal output by the depth sensor pixel D, and output a result of the processing as the image data IDATA.

Figure 27:
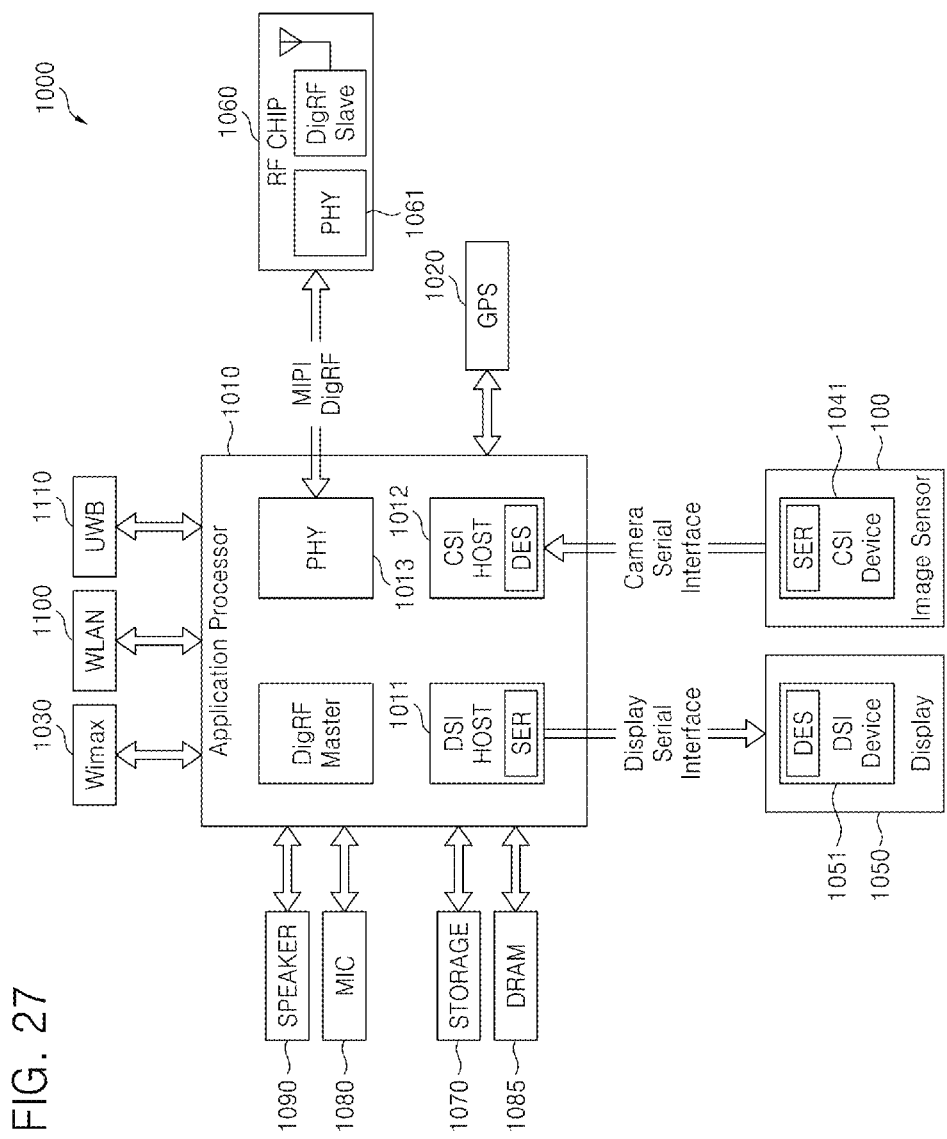
FIG. 27 is a block diagram of an electronic system including the image sensor illustrated in FIG. 1, according to the exemplary embodiments.

FIG. 27 is a block diagram of an electronic system 1000 including the image sensor 100 of FIG. 1, according to the exemplary embodiments. Referring to FIGS. 1 and 27, the electronic system 1000 may be implemented using a data processing device capable of using or supporting a mobile industry processor interface (MIPI)®, for example, a personal digital assistant (PDA), a portable multi-media player (PMP), an internet protocol television (IPTV), or a smart phone.

The electronic system 1000 includes the image sensor 100, an application processor 1010, and a display 1050.

A camera serial interface (CSI) host 1012, implemented in the application processor 1010, may serially communicate with a CSI device 1041 of the image sensor 100 via a CSI. In this case, for example, the CSI host 1012 may include a deserializer DES, and the CSI device 1041 may include a serializer SER.

A display serial interface (DSI) host 1011, implemented in the application processor 1010, may serially communicate with a DSI device 1051 of the display 1050 via a DSI. In this case, for example, the DSI host 1011 may include a serializer SER, and the DSI device 1051 may include a deserializer DES.

According to an embodiment, the electronic system 1000 may further include a radio frequency (RF) chip 1060 capable of communicating with the application processor 1010. A physical layer (PHY) 1013, included in the application processor 1010 and a PHY 1061 included in the RF chip 1060, may transmit and receive data to and from each other via MIPI DigRF.

According to an embodiment, the electronic system 1000 may further include a global positioning system (GPS) 1020, a storage 1070, a microphone (MIC) 1080, a dynamic random access memory (DRAM) 1085, and a speaker 1090. The electronic system 1000 may perform communication via world interoperability for microwave access (Wimax) 1030, a wireless local area network (WLAN) 1100, and/or an ultra-wideband (UWB) 1110.

Figure 28:
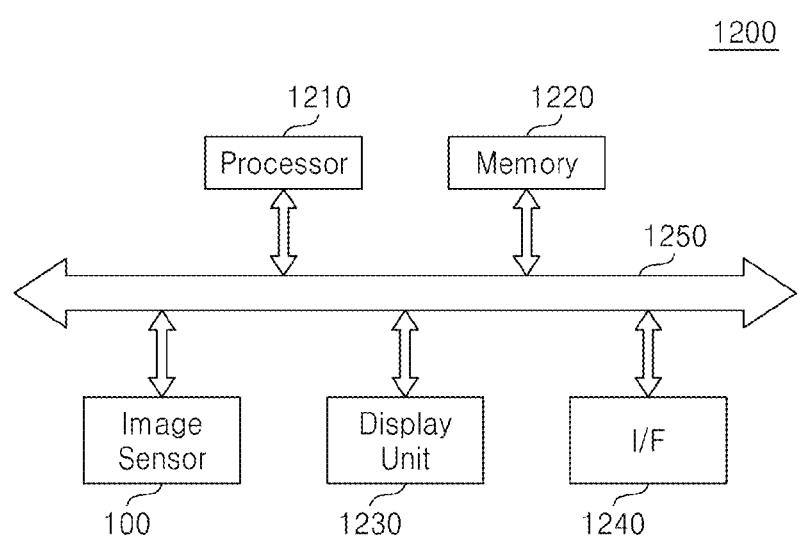
FIG. 28 is a block diagram of an image processing system including the image sensor illustrated in FIG. 1, according to the exemplary embodiments.

FIG. 28 is a block diagram of an image processing system 1200 including the image sensor 100 of FIG. 1, according to the exemplary embodiments. Referring to FIGS. 1 and 28, the image processing system 1200 may include the image sensor 100, a processor 1210, a memory 1220, a display unit 1230, and an interface (I/F) 1240.

The processor 1210 may control an operation of the image sensor 100. For example, the processor 1210 may generate a 2D or 3D image based on the depth information and the motion information, received from the image sensor 100. The memory 1220 may store a program for controlling an operation of the image sensor 100 via a bus 1250 under the control of the processor 1210, and images generated by the processor 1210. The processor 1210 may execute the program by accessing stored information. The memory 1220 may be implemented using a non-volatile memory.

The image sensor 100 may generate 2D or 3D image information based on each digital pixel signal, for example, depth information output by a depth sensor pixel and/or motion information output by a motion sensor pixel, under the control of the processor 1210.

The display unit 1230 may receive an image from the processor 1210 or the memory 1220 and display the image on a display, for example, a Liquid Crystal Display (LCD), a Light Emitting Diode (LED) display, an Organic Light Emitting Diode (OLED) display, an Active Matrix OLED (AMOLED) display, or a flexible display.

The I/F 1240 may be implemented using an interface for receiving and outputting a 2D or 3D image. According to an embodiment, the I/F 1240 may be implemented using a wireless interface.

In a method and a device according to the exemplary embodiments, a motion of an object may be precisely recognized by obtaining data based on a pixel signal output by a depth sensor pixel according to various usage environments. In addition, in the method and the device according to the exemplary embodiments, obtaining the data based on a pixel signal output by a depth sensor pixel according to various usage environments may also lead to a reduction in power consumption. In the method and the device according to the exemplary embodiments, either precise recognition of an image of an object or reduction in power consumption may be selected according to various usage environments.

While the exemplary embodiments have been particularly shown and described with reference to exemplary embodiments thereof, it will be understood that various changes in form and details may be made therein without departing from the spirit and scope of the following claims.

What is claimed is:

1. A method of operating an image sensor chip which comprises a motion sensor pixel sensing a motion of an object and a depth sensor pixel, the method comprising:
    activating either the depth sensor pixel or the motion sensor pixel according to a mode selection signal; and
    processing a pixel signal output by either the activated depth sensor pixel or the activated motion sensor pixel.

2. The method of claim 1, before the activating either the depth sensor pixel or the motion sensor pixel, further comprising:
    activating the motion sensor pixel as default; and
    changing a level of the mode selection signal, based on a pixel signal output from the default activated motion sensor pixel.

3. The method of claim 2, wherein the changing the level of the mode selection signal includes changing the level of the mode selection signal when data generated by a result of a processing of the pixel signal output from the default activated motion sensor pixel is consistent with reference data.

4. The method of claim 1, before the activating either the depth sensor pixel or the motion sensor pixel, further comprising:
    analyzing a user input; and
    generating the mode selection signal according to the analyzed result of the user input.

5. The method of claim 1, wherein the motion sensor pixel is a dynamic vision sensor (DVS) pixel, and the depth sensor pixel is a time-of-flight (TOF) sensor pixel obtaining depth information between the object and the image sensor chip according to a TOF method.

6. A method of operating an image sensor chip that comprises a motion sensor pixel capable of sensing a motion of an object and a depth sensor pixel, the method comprising:
    activating the motion sensor pixel;
    determining whether to activate the depth sensor pixel, according to a mode selection signal; and
    processing a pixel signal output by either the motion sensor pixel or the depth sensor pixel, based on a result of the determination and the mode selection signal.

7. The method of claim 6, wherein the processing the pixel signal includes processing the pixel signal output by the depth sensor pixel when the depth sensor pixel is activated, and processing the pixel signal output by the motion sensor pixel when the depth sensor pixel is deactivated.

8. The method of claim 6, wherein the motion sensor pixel is a dynamic vision sensor (DVS) pixel, and the depth sensor pixel is a time-of-flight (TOF) sensor pixel obtaining depth information between the object and the image sensor chip according to a time-of-flight (TOF) method.

9. An image sensor chip comprising:
    a pixel array including a depth sensor pixel group which includes a plurality of depth sensor pixels and a motion sensor pixel group which includes a plurality of motion sensor pixels;

a control circuit which is configured to activate either the depth sensor pixel group or the motion sensor pixel group, according to a mode selection signal; and a pixel signal processing circuit which is configured to process pixel signals, output by either the activated depth sensor pixel group or the activated motion sensor pixel group.

10. The image sensor chip of claim 9, further comprising a motion sensor pixel enable controller which is configured to control power, which is supplied to the motion sensor pixel group, under a control of the control circuit.

11. The image sensor chip of claim 9, wherein each of the plurality of motion sensor pixels is a dynamic vision sensor (DVS) pixel, and the pixel signal processing circuit includes:

a row address event representation (AER) which is configured to process at least one of a plurality of event signals generated by the plurality of motion sensor pixels; and a column AER which is configured to process at least one other of the plurality of event signals generated by the plurality of motion sensor pixels, and wherein the row AER is arranged on an opposite side of a row driver for activating the plurality of depth sensor pixels.

12. The image sensor chip of claim 9, wherein each of the plurality of motion sensor pixels is a DVS pixel, and the pixel signal processing circuit includes:

a row AER which is configured to process at least one of a plurality of event signals generated by the plurality of motion sensor pixels; and a column AER which is configured to process at least another of the plurality of event signals generated by the plurality of motion sensor pixels, and wherein the row AER is arranged on a same side as a row driver for activating the plurality of depth sensor pixels.

13. The image sensor chip of claim 9, wherein the motion sensor pixel group and the depth sensor pixel group are separately arranged from each other.

14. The image sensor chip of claim 9, wherein each of the plurality of motion sensor pixels is disposed between the depth sensor pixels.

15. The image sensor chip of claim 9, wherein the plurality of motion sensor pixels are disposed on edges of the depth sensor pixel group.

16. The image sensor chip of claim 9, wherein the plurality of motion sensor pixels alternate with the plurality of depth sensor pixels in a row direction.

17. The image sensor chip of claim 9, wherein the plurality of motion sensor pixels alternate with the plurality of depth sensor pixels in a column direction.

18. The image sensor chip of claim 9, wherein a size of each of the plurality of motion sensor pixels is different from a size of each of the plurality of depth sensor pixels.

19. The image sensor chip of claim 9, wherein a motion sensor pixel and a depth sensor pixel having an identical column address, from among the plurality of motion sensor pixels and the plurality of depth sensor pixels, share at least one signal line.

20. The image sensor chip of claim 9, wherein the pixel signal processing circuit includes:

a motion sensor pixel signal processing circuit which is configured to process pixel signals output by the motion sensor pixel group; and a depth sensor pixel signal processing circuit which is configured to process pixel signals output by the depth sensor pixel group.

21. The image sensor chip of claim 20, wherein the pixel signal processing circuit further comprises an output selection circuit which is configured to select either an output of the motion sensor pixel signal processing circuit or an output of the depth sensor pixel signal processing circuit.

22. A system on chip (SoC) comprising:

the image sensor chip of claim 9;

an image signal processor (ISP) which is configured to processes image data output from the image sensor chip; and a central processing unit (CPU) which is configured to receive processed image data from the ISP and generates a mode selection signal based on the processed image data.

23. An image sensor chip comprising:

a pixel array including a depth sensor pixel and a motion sensor pixel; and an output selection circuit which is configured to select either a signal received from the depth sensor pixel or a signal received from the motion sensor pixel according to a mode selection signal, and output the selected signal, wherein the output selection circuit includes a multiplexer.

24. The image sensor chip of claim 23, wherein the motion sensor pixel is a dynamic vision sensor (DVS) pixel, and the depth sensor pixel is a time-of-flight (TOF) sensor pixel.

25. An image processing system comprising:

an image sensor which generates image data corresponding to either depth information from at least one depth sensor pixel or motion information from at least one motion sensor pixel according to a mode selection signal, and transmits the image data;

an image signal processor (ISP) which is configured to receive and process the image data from the image sensor, and transmit the processed image data;

a central processing unit (CPU) which is configured to generate the mode selection signal according to one of the processed image data from the ISP and a signal from a power monitoring module, and transmit the mode selection signal; and a display unit which is configured to receive the processed image data, and display the processed image data.

26. The image processing system of claim 25, wherein the power monitoring module determines whether the image processing system has sufficient power, and transmits the signal to the CPU when the image processing system does not have sufficient power.

27. The image processing system of claim 25, wherein when the CPU is configured to generate the mode selection signal according to the processed image data from the ISP, the CPU compares the processed image data with reference data, and generates the mode selection signal based on a result of the comparison.

28. The image processing system of claim 25, wherein the image sensor generates the image data corresponding to either the depth information or the motion information based on the mode selection signal from the CPU.

* * * * *